United States Patent
Kanazawa et al.

(10) Patent No.: US 6,508,072 B1
(45) Date of Patent: Jan. 21, 2003

(54) AIR CONDITIONER OUTDOOR UNIT DRIVE CONTROL UNIT

(75) Inventors: Hidetoshi Kanazawa, Fuji (JP); Hiroshi Miyazaki, Fuji (JP); Takashi Kobayashi, Fuji (JP); Takayuki Kambe, Mishima (JP); Junichi Takuma, Fuji (JP); Hiroyuki Isegawa, Fuji (JP)

(73) Assignee: Toshiba Carrier Corporation, Tokyo-To (JP)

(*) Notice: Subject to any disclaimer, the term of this patent is extended or adjusted under 35 U.S.C. 154(b) by 0 days.

(21) Appl. No.: 09/830,313

(22) PCT Filed: Sep. 22, 1999

(86) PCT No.: PCT/JP99/05204
§ 371 (c)(1),
(2), (4) Date: Apr. 26, 2001

(87) PCT Pub. No.: WO00/25070
PCT Pub. Date: May 4, 2000

(30) Foreign Application Priority Data

Oct. 26, 1998 (JP) .......................................... 10-304128

(51) Int. Cl.⁷ ................................................ F24F 11/02
(52) U.S. Cl. ......................... 62/228.4; 62/229; 62/298; 236/78 D
(58) Field of Search ............................ 62/228.1, 228.4, 62/228.5, 215, 298, 157, 158, 231; 236/78 D, 1 E, 1 EA

(56) References Cited

U.S. PATENT DOCUMENTS

| | | | | |
|---|---|---|---|---|
| 4,612,776 A | * | 9/1986 | Alsenz | 236/1 EA |
| 4,763,485 A | * | 8/1988 | Sparks | 62/298 X |
| 5,115,968 A | * | 5/1992 | Grald | 236/78 D |
| 5,655,380 A | * | 8/1997 | Calton | 62/228.4 X |

FOREIGN PATENT DOCUMENTS

| | | |
|---|---|---|
| JP | 59-221547 | 12/1984 |
| JP | 63-32253 | 2/1988 |
| JP | 63-273764 | 11/1988 |
| JP | 1-78273 | 5/1989 |
| JP | 3-117847 | 5/1991 |
| JP | 4-351494 | 12/1992 |
| JP | 5-346256 | 12/1993 |
| JP | 10-122637 | 5/1998 |

* cited by examiner

*Primary Examiner*—Harry B. Tanner
(74) *Attorney, Agent, or Firm*—Foley & Lardner

(57) ABSTRACT

When an outdoor machine 2 includes a signal line connector 21 for receiving ON/OFF signals for a compressor, an outdoor machine drive control unit 30 of an air conditioner includes an inverter device 32 for supplying power variable in frequency to the compressor 22, and a control device 33 for controlling the inverter device 32 to gradually increase the number of revolutions of the compressor 22 when the ON/OFF signal for the compressor received through the signal line connector 21 changes from the OFF condition to the ON condition. The air conditioner outdoor machine drive control unit 30 enables to construct an inverter-type air conditioner by using a general heat-pump-type indoor machine and merely mounting it in an outdoor machine.

22 Claims, 17 Drawing Sheets

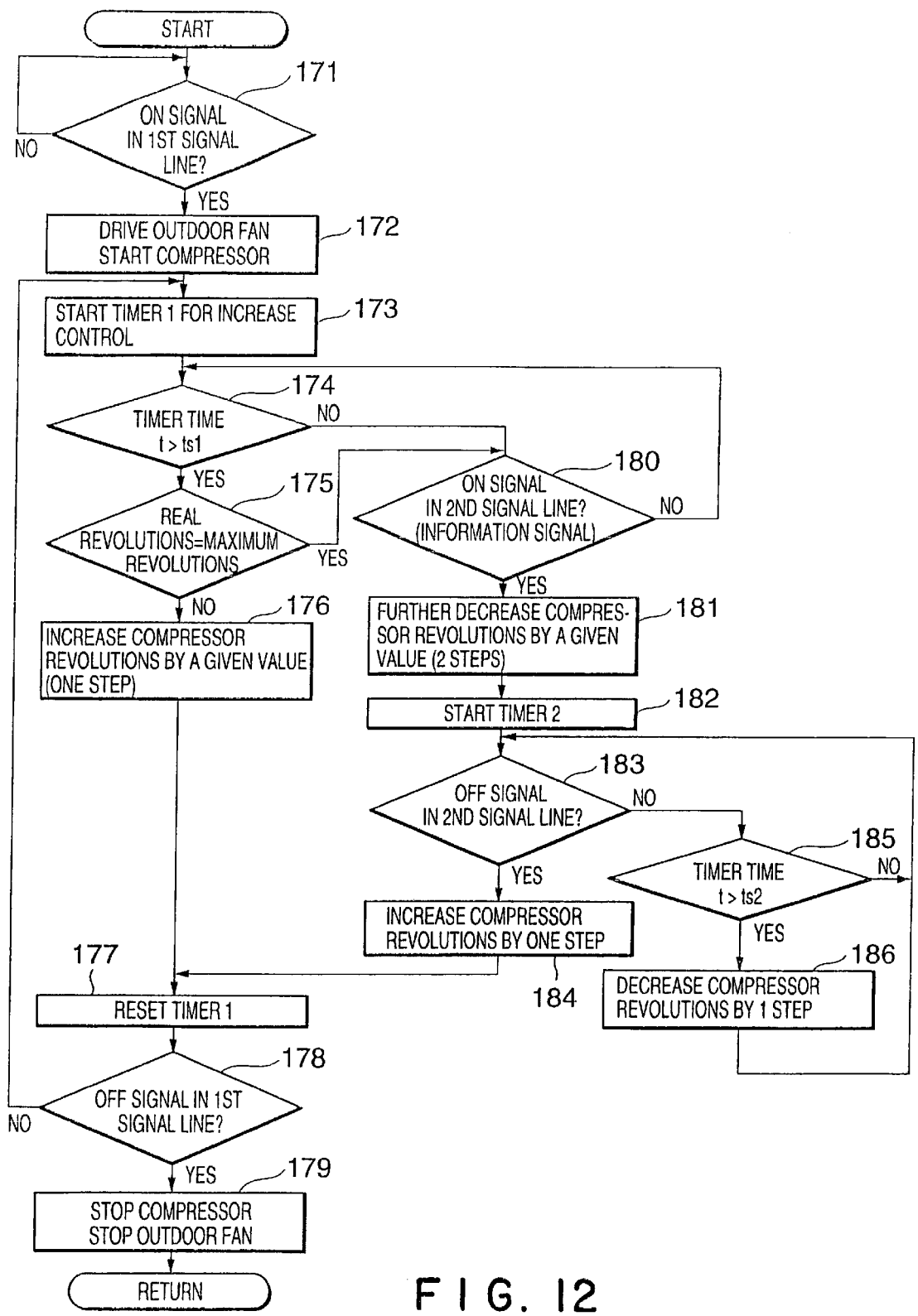
F I G. 12

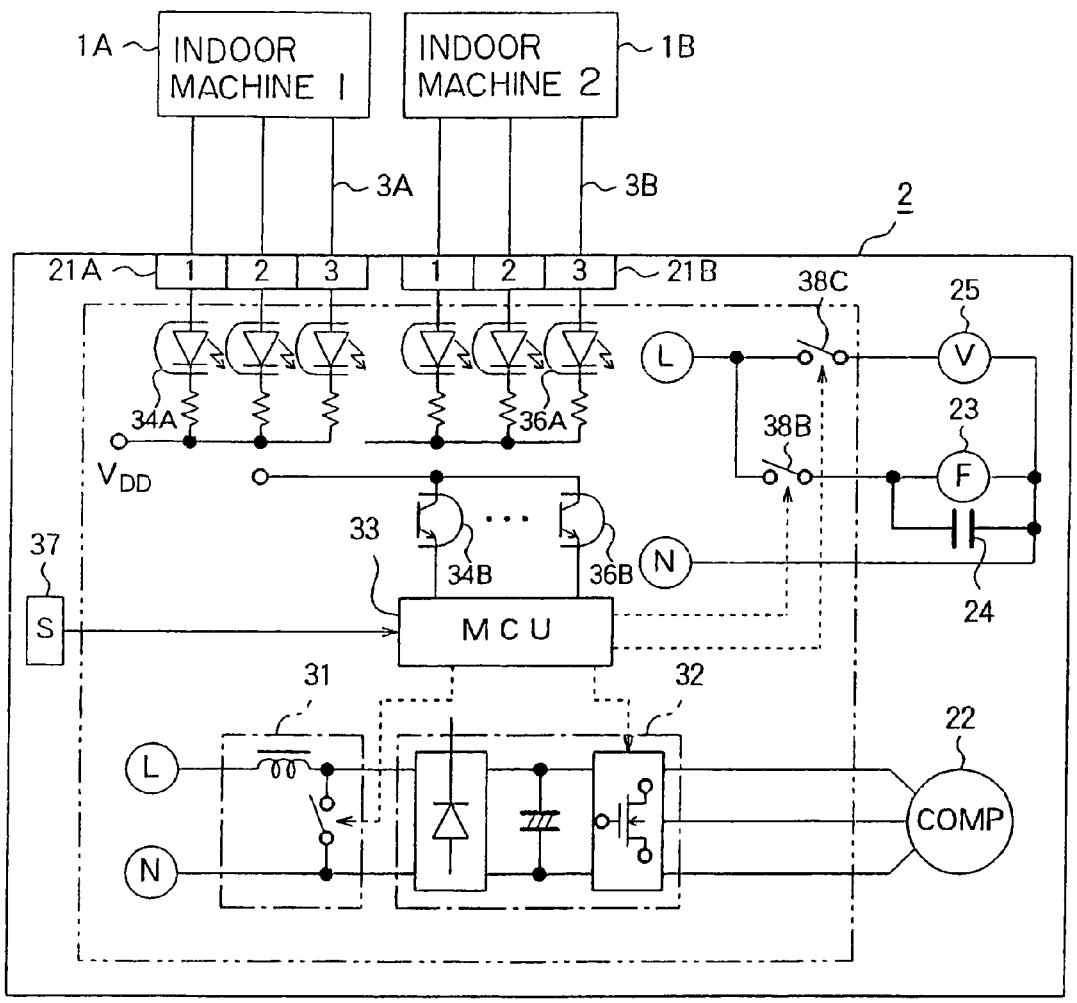
F I G. 14

AIR CONDITIONER OUTDOOR UNIT DRIVE CONTROL UNIT

TECHNICAL FIELD

This invention relates to a separate-type air conditioner whose outdoor machine includes a signal line connected portion for receiving ON/OFF signals of its compressor, and more particularly, to a outdoor machine drive control unit in the air conditioner for power-controlling and driving its compressor in response to ON/OFF signals from its indoor machine.

BACKGROUND ART

Separate-type air conditioners made up of an outdoor machine and an indoor machine involve ones of a so-called general heat-pump system in which a compressor constant in rotational speed is controlled in ON/OFF motion in response to the air-conditioning load, and ones of a so-called inverter system in which the compressor is controlled in power in response to the air-conditioning load. Among them, the inverter system has advantages in saving energy, enabling stepless, highly responsive speed control, enabling adjustment of the speed of a general-purpose motor without the need for any auxiliary device, requiring only a small start current for the motor, and so forth.

Then, there was an attempt to remodel a general heat-pump-type air conditioner to an inverter-type air conditioner.

However, due to a large difference in control method between them, remodeling was not easy. Structure of a general heat-pump-type air conditioner the invention is directed to will be explained below in detail, clarifying differences from an inverter-type air conditioner.

FIG. 17 is a diagram of a control circuit of a general heat-pump-type air conditioner. In the air conditioner, an outdoor machine 1 and an indoor machine 2 are connected by a plurality of crossover lines 3. The indoor machine 1 includes a power source connector terminal 11 and an indoor-side connector terminal 13. The power source connector terminal 11 includes power source line connectors L, N and a grounding line connector E. The indoor-side connector terminal 13 includes a power source line connector N, first signal line connector for transmitting ON/OF signals for the compressor, second signal line connector for transmitting ON/OFF signals for an outdoor fan, third signal line connector for transmitting ON/OFF signals to switch a four-way valve to the cooling side or the heating side, and grounding line connector E.

The power source line connector N of the power source connector terminal 11 is directly connected to the power source line connector N of the indoor-side connector terminal 13. The power source line connector L of the power source connector terminal 11 is connected to the first, second and third signal line connectors of the indoor-side connector terminal 13 via a relay contact 18a for the compressor, relay contact 18B for the outdoor fan and relay contact 18C for the four-way valve, which constitute an indoor controller 12. The indoor controller 12 includes a microcomputer unit (hereinafter abbreviated MCU) 14, and it is configured to control an indoor fan 15 and to control ON/OFF states of the relay contacts 18A, 18B and 18C in accordance with the room temperature detected by a temperature sensor 16, temperature of an indoor heat exchanger detected by a temperature sensor 17, and so on.

On the other hand, the outdoor machine 2 includes a compressor 22 connected to the outdoor-side connector terminal 21, outdoor fan 23 and four-way valve 25. The outdoor-side connector terminal 21 includes a power source line connector N, first signal line connector for receiving ON/OFF signals for the compressor, second signal line connector for receiving ON/OFF signal for the outdoor fan, third signal line connector for receiving ON/OFF signals to switch the four-way valve to the cooling side or the heating side, and grounding line connector E, which are connected to corresponding connectors in the indoor-side connector terminal 13 by a plurality of lines.

In the outdoor machine 2, one end of the compressor 22 is connected to the first signal line connector, and the other end there of is connected to the power source line connector N. Further, a phase-advance coil terminal is connected to the power source line connector N via a phase-advance capacitor. One end of the outdoor fan 23 is connected to the second signal line connector, and the other end there of is connected to the power source line connector N. Further, a phase-advance coil terminal is connected to the power source line connector N via a phase-advance capacitor 24. One end of the four-way valve 25 is connected to the third signal line connector, and the other end thereof is connected to the power source line connector N.

In the above-explained structure, MCU 14 forming the indoor controller 12 controls the indoor fan 15 to drive or stop it in accordance with a drive mode instructed from outside, temperatures detected by the temperature sensors 16, 17, and so on, and controls ON/OFF conditions of the relay contacts 18A, 18B and 18C. Its ON/OFF signals are transmitted to the outdoor machine 2 via the crossover lines 3. Thereby, driving or stopping the compressor 22, driving or stopping the outdoor fan 23 and energizing or deenergizing the four-way valve 25 are controlled to effect known heating operation, cooling operation or defrosting operation.

In contrast, an inverter-type air conditioner, the present invention is not directed to, is roughly explained below, omitting illustration thereof in a drawing.

An instruction from a remoter controller and a signal from a temperature sensor are arithmetically processed by MCU forming a indoor controller, and driving materials except for the ventilation amount of the indoor fan are transmitted in form of a serial signal to the outdoor machine via crossover lines. A source voltage supplied to the outdoor machine is converted into a direct current by a converter generically named an inverter device, and becomes a pseudo three-phase alternating current in the inverter portion. The serial signal supplied from the indoor controller as the drive instruction signal is decoded in content by MCU forming the outdoor controller, and mixed and operated with information from sensors of the outdoor machine. Then, a decided actual drive frequency signal is supplied as a drive signal to the inverter portion. the inverter portion switches a transistor module with the drive signal, and outputs it as a pseudo three-phase alternating current to the compressor.

As explained above, the general heat-pump-type air conditioner and the inverter-type air conditioner are different in indoor machine from the viewpoint of structure and way of signal processing, also in outdoor machine, and also in transmitted signal. Therefore, it has been considered difficult as a system to remodel a general heat-pump-type air conditioner to have functions of an inverter-type air conditioner.

The invention has been made taking these circumstances into consideration, and its object lies in providing a outdoor machine drive control unit in an air conditioner, which makes it possible to construct an inverter-type air conditioner by using a general heat-pump-type indoor machine unchanged and merely mounting it in the outdoor machine.

Disclosure of Invention

An outdoor machine drive control unit for an air conditioner according to the invention is characterized in an outdoor machine drive control unit for an air conditioner of a separate type having a signal line connector provided in an outdoor machine to receive an ON/OFF signal for a compressor exclusively, comprising: an inverter device for supplying the compressor with power variable in frequency; and a control device for controlling the inverter device to gradually increase the number of revolutions of the compressor when the ON/OFF signal for the compressor received through the signal line connector changes from the OFF condition to the ON condition.

Further, an outdoor machine drive control unit for an air conditioner according to the invention is characterized in an outdoor machine drive control unit for an air conditioner of a separate type having a signal line connector provided in an outdoor machine to receive an ON/OFF signal for a compressor exclusively, comprising: an inverter device for supplying the compressor with power variable in frequency; and a control device for controlling the inverter device to increase the number of revolutions of the compressor to a preset number of revolutions when the ON/OFF signal for the compressor received through the signal line connector changes from the OFF condition to the ON condition.

In case of these outdoor machine drive control units in air conditioners, the control device may control the inverter device so as to gradually decrease the number of revolutions of the compressor when ON/OFF signals for the compressor change from the ON condition to the OFF condition.

Alternatively, the control device may control the inverter device so as to decrease the number of revolutions of the compressor to a minimum number of revolutions lower than a preset number of revolutions by a predetermined value when ON/OFF signals for the compressor change from the ON condition to the OFF condition.

When decreasing the number of revolutions of the compressor to the minimum number of revolutions, the control device Additionally, the control device decrease the number of revolutions gradually.

An outdoor machine drive control unit for an air conditioner according to the invention is characterized in an outdoor machine drive control unit for an air conditioner of a separate type having a signal line connector provided in an outdoor machine to receive an ON/OFF signal for a compressor exclusively, comprising: an inverter device for supplying the compressor with power variable in frequency; and a control device including a timer means for cumulatively counting the duration of time of the ON condition after the ON/OFF signal for the compressor changes from the OFF condition to the ON condition so as to increase or decrease the number of revolutions of the compressor depending on the length of the duration of time of the ON condition.

With the structure summarized above, it is possible to construct an inverter-type air conditioner by using a general heat-pump-type indoor machine unchanged and merely mounting it in the outdoor machine.

An outdoor machine drive control unit for an air conditioner according to the invention is characterized in an outdoor machine drive control unit for an air conditioner of a separate type having a signal line connector provided in an outdoor machine to receive an ON/OFF signal for a compressor exclusively, comprising: an inverter device for supplying said compressor with power variable in frequency; and a control device including a timer means for cumulatively counting the duration of time of the OFF condition since said ON/OFF signal for the compressor changes from the OFF condition to the ON condition until returning to the ON condition, so as to increase or decrease the number of revolutions of said compressor after returning to the ON condition, depending on the length of said duration of time of the OFF condition.

In this case, the control device may control the inverter device so as to increase the number of revolutions of the compressor when the duration of time of the OFF state exceeds a preset value. A plurality of such preset values different in value may be determined.

With the structure summarized above, in addition to the effect that an inverter-type air conditioner can be made by using a general heat-pump-type indoor machine unchanged and merely mounting it in the outdoor machine, also obtained are the effects that the air conditioner can be started in a frequency meeting the desired power and intermittent driving can be prevented.

An outdoor machine drive control unit for an air conditioner according to the invention is characterized in an outdoor machine drive control unit for an air conditioner of a separate type having a signal line connector provided in an outdoor machine to receive an ON/OFF signal for a compressor exclusively, comprising: an inverter device for supplying the compressor with power variable in frequency; a temperature sensor for detecting temperature of a refrigeration cycle component provided in the outdoor machine; and a control device for controlling the inverter device to increase or decrease the number of revolutions of the compressor in response to the temperature of the refrigeration cycle component detected by the temperature sensor when the ON/OFF signal for the compressor exhibits the ON condition.

In this case, the control device may control the inverter device to reduce the difference between the detected temperature of the cooling cycle member and the preset reference temperature.

With the construction summarized above, it is possible to construct an inverter-type air conditioner by using a general heat-pump-type indoor machine unchanged and merely mounting it in the outdoor machine.

An outdoor machine drive control unit for an air conditioner according to the invention is characterized in an outdoor machine drive control unit for an air conditioner of a separate type having a first signal line connector for receiving an ON/OFF signal for a compressor exclusively, a second signal line connector for receiving an ON/OFF signal for an outdoor fan exclusively, and a third signal line connector for receiving an ON/OFF signal for switching a four-way valve to a cooling side or a heating side exclusively, which are provided in an outdoor machine, comprising: an inverter device for supplying the compressor with power variable in frequency; and a control device including a microcomputer for controlling output frequency of the inverter device, driving or stopping of the outdoor fan and switching of the four-way valve in response to a combination of ON/OFF conditions of the ON/OFF signals received by the first, second and third signal line connectors.

In this case, when the ON/OFF signal of the compressor is ON, the ON/OFF signal of the outdoor fan is ON, and the ON/OFF signal of the four-way valve changes from the heating side to the cooling side, the control device may control the inverter device to increase the number of revolutions of the compressor to a preset number of revolutions for the defrosting drive mode.

Additionally, after the control device increases the number of revolutions of the compressor to the preset number of revolutions for the defrosting drive mode, when the ON/OFF signal of the compressor is ON and the ON/OFF signal of the four-way valve returns in status to the cooling side to the heating side, the control device may control the inverter to drive for a predetermined time under a number of revolutions lower than its number of revolutions before the four-way valve changes from the heating side to the cooling side, and to switch the four-way valve from the cooling side to the heating side after driving the compressor under the lower number f revolutions for the predetermined time.

With the structure summarized above, it is possible to construct an inverter-type air conditioner by using a general heat-pump-type indoor machine unchanged and mounting it in an outdoor machine and to drive in the defrosting mode similarly to an existing inverter-type air conditioner.

Moreover, the control device may include a first microcomputer for controlling the inverter device exclusively, and a second computer connected to the first, second and third signal line connectors to transmit control signals to a four-way valve driving device, an outdoor fan driving device and the first microcomputer in accordance with ON/OFF signal received through the signal line connectors.

This structure additionally provides the effect that the major component can be assembled in two divisional parts to make it much easier to mount it in any of various kinds of outdoor machines different in size and configuration.

An outdoor machine drive control unit for an air conditioner according to the invention is characterized in an outdoor machine drive control unit for an air conditioner of a separate type having a first signal line connector for receiving an ON/OFF signal for a compressor exclusively, a second signal line connector for receiving an ON/OFF signal indicating whether the difference of the room temperature from a preset temperature is larger than a predetermined value or not, and a third signal line connector for receiving an ON/OFF signal for switching a four-way valve to a cooling side or a heating side exclusively, which are provided in an outdoor machine, comprising: an inverter device for supplying the compressor with power variable in frequency; and a control device including a microcomputer for controlling driving or stopping of the outdoor fan, switching of the four-way valve and the inverter device in response to a combination of ON/OFF conditions of the signals received by the first, second and third signal line connectors.

In this case, the control device may decrease the number of revolutions of the compressor by a predetermined value when it is detected from the ON or OFF condition of the signal through the second signal line connector that the difference of the room temperature from the preset temperature is not larger than the predetermined value.

Additionally, the control device may decrease the number of revolutions of the compressor by a predetermined value when it is detected from the ON or OFF condition of the signal through the second signal line connector that the difference of the room temperature from the preset temperature is not larger than the predetermined value, and may thereafter increase the number of revolutions of the compressor by a predetermined value when it is detected from the ON or OFF condition of the signal through the second signal line connector that the difference of the room temperature from the preset temperature is larger than the predetermined value.

Alternatively, the control device may decrease the number of revolutions of the compressor by a first predetermined value when it is detected from the ON or OFF condition of the signal through the second signal line connector that the difference of the room temperature from the preset temperature is not larger than the predetermined value, and may thereafter increase the number of revolutions of the compressor by a second predetermined value smaller than the first predetermined value when it is detected from the ON or OFF condition of the signal through the second signal line connector that the difference of the room temperature from the preset temperature is larger than the predetermined value.

With this arrangement, it is possible to construct a inverter-type air conditioner by using a general heat-pump-type indoor machine unchanged and mounting it in an outdoor.

The outdoor machine may include a plurality of sets of signal line connectors, each set including the first, second and third signal line connectors, and the control device controls output frequency of the inverter device, driving or stopping of the outdoor fan and switching of the four-way valve in response to a combination of ON/OFF conditions of the ON/OFF signals through the first, second and third signal line connectors.

With this arrangement, it is possible to construct a inverter-type air conditioner by using a general heat-pump-type indoor machine unchanged it is and mounting it in an outdoor and to reduce changes in room temperature.

In the outdoor machine control unit in an air conditioner, the control device may include a power converter means for converting an a.c. voltage from an a.c. power source into a d.c. voltage, a reactor connected in series to one end of the power converter means nearer to the a.c. power source, and a short-circuiting means for short-circuiting the a.c. power source near a zero cross point of an a.c. voltage waveform via the reactor for a predetermined period.

This structure also provides the effect of improving the source power factor.

Alternatively, in the outdoor machine control unit in an air conditioner, the control device may include a power converter means for converting an a.c. voltage from an a.c. power source into a d.c. voltage, a reactor connected in series to one end of the power converter means nearer to the a.c. power source, and a short-circuiting means for short-circuiting the a.c. power source near a zero cross point of an a.c. voltage waveform via the reactor for a first predetermined period and immediately thereafter short-circuiting same for a second predetermined period shorter than the first predetermined period.

This structure also provides the effect of preventing generation of unpleasant noise caused by short-circuiting a reactor to improve the source power factor.

BRIEF DESCRIPTION OF DRAWINGS

FIG. 12 is a flow chart showing a processing procedure corresponding to a function of a microcomputer which is a major component of the fourth embodiment shown in FIG. 11;

FIG. 14 is a control circuit diagram in the case where a fifth embodiment of the outdoor machine drive control unit in an air conditioner according to the invention is mounted in an outdoor machine of a multi-type air conditioner;

BEST MODE FOR CARRYING OUT THE INVENTION

Figure 1:
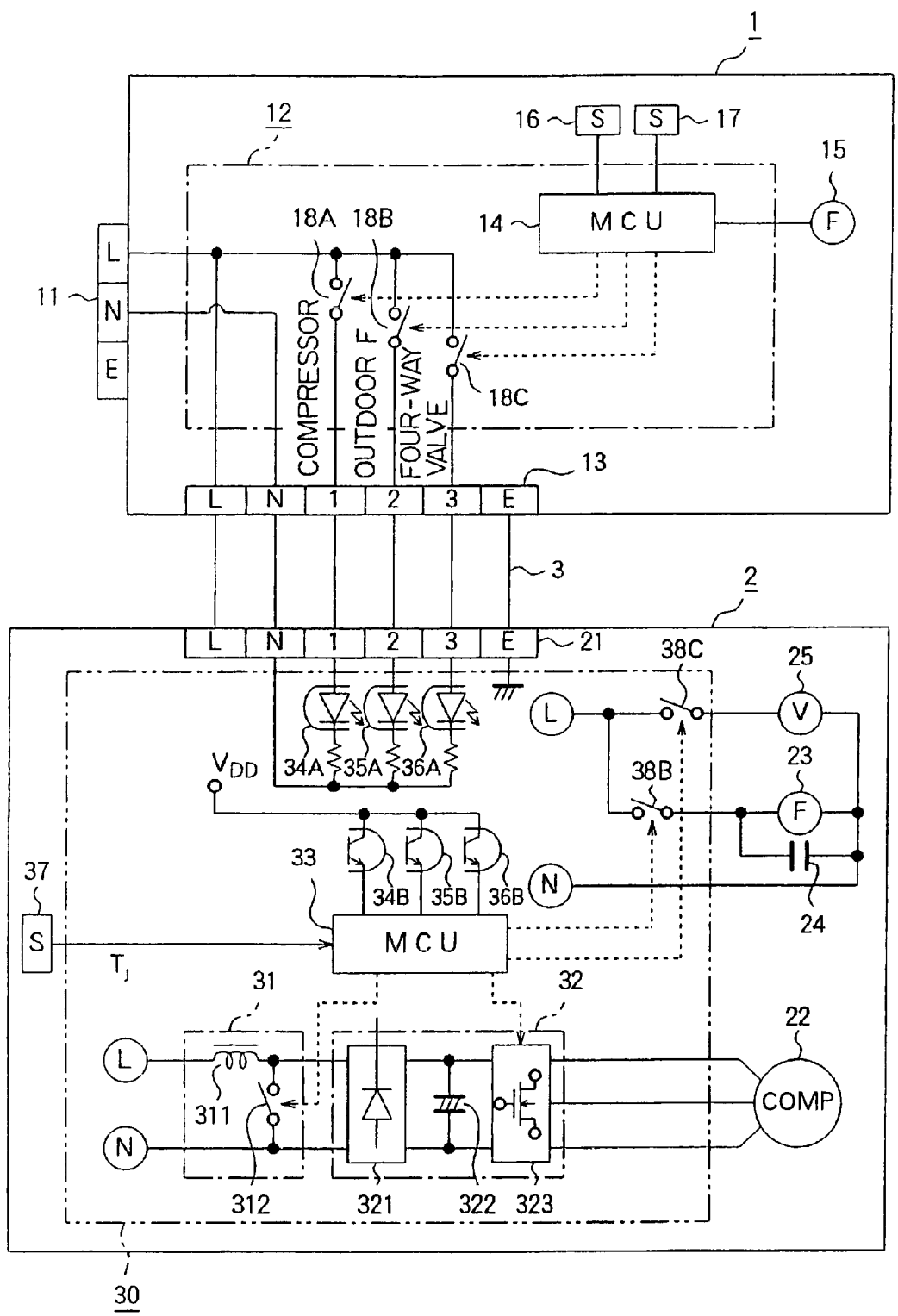
FIG. 1 is a control circuit diagram of the entirety of an air conditioner in which the first embodiment of the outdoor machine drive control unit in the air conditioner according to the invention is mounted.

Explained below is the present invention in detail by way of preferred embodiments shown in the drawings.

Figure 17:
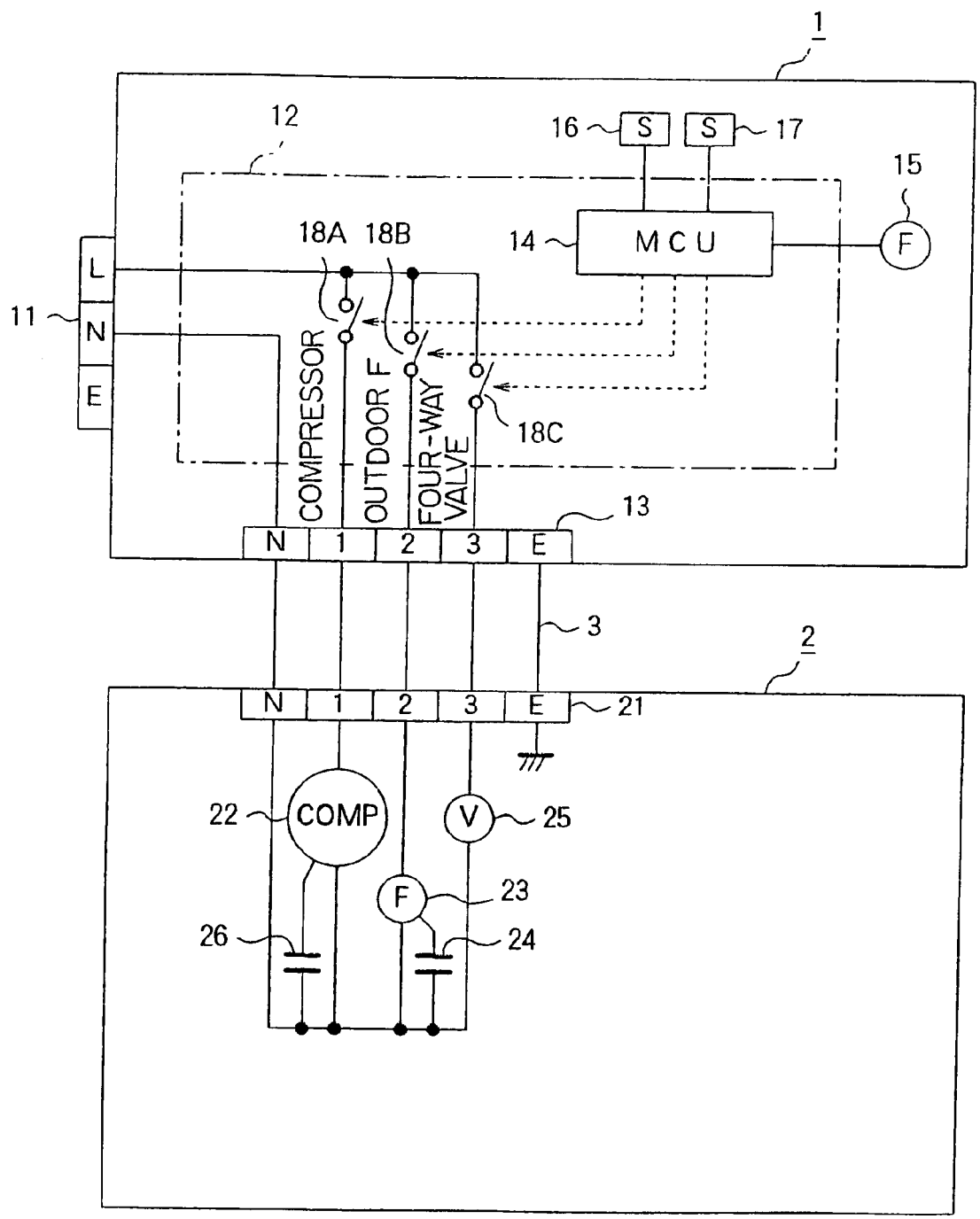
FIG. 17 is a control circuit diagram of a general heat-pump-type air conditioner to which the present invention is directed.

FIG. 1 is a control circuit diagram showing the structure of the first embodiment of an outdoor machine drive control unit in an air conditioner according to the invention, and the entirety of the air conditioner in which the unit is mounted in its outdoor machine. In FIG. 1, components common to those of FIG. 17 showing the related device are labeled with common reference numerals and their explanation is omitted. An outdoor machine drive control unit 30 is interposed in the way from an outdoor machine side connecting terminal 21 of an outdoor machine 2 to a compressor 22 containing an inverter-driven three-phase brushless motor, outdoor fan 23 and four-way valve 25.

An indoor machine 1 has an indoor machine side connector terminal 13 which includes power line connectors L, N, a first signal line connector exclusive for transmitting ON/OFF signals for the compressor, a second signal line connector exclusive for transmitting ON/OFF signals for the outdoor fan, a third signal line connector exclusive for transmitting ON/OFF signals to change the four-way valve to the cooling side or the heating side, and grounding line connector E. The outdoor machine 2 has a an outdoor machine side connector terminal 21 which includes power line connectors L, N, a first signal line connector exclusive for receiving the ON/OFF signals for the compressor, a second signal line connector exclusive for receiving the ON/OFF signals for the outdoor fan, a third signal line connector exclusive for receiving the ON/OFF signals for the four-way valve, and grounding line connector E. And the respectively corresponding connectors of the indoor machine 1 and the outdoor machine 2 are connected by a plurality of crossover lines 3.

The outdoor machine drive control unit 30 mainly includes a short-circuiting device 31, an inverter device 32, photocouplers made up of a light emitting element 34A and a photo detector element 34B, light emitting element 35A and a photo detector element 35B, a light emitting element 36A and a photo detector element 36B, an MCU 33, a temperature sensor 37, a relay contact 38B for supplying a drive power to the outdoor fan 23, a relay, not shown, having a relay contact 38C for supplying an energization power of the four-way valve 25.

Among them, the short-circuiting device 31 includes a reactor 311 and a switching circuit 312 as explained later in greater detail, to improve the power factor by short-circuiting the alternating current power source near zero cross points of the waveform of the alternating current voltage supplied from the power line connectors L and N via the reactor for a predetermined time. The inverter device 32 is connected to the output side of the short-circuiting device 31. The inverter device 32 includes a rectifying circuit 321 for rectifying the a.c. voltage, smoothing capacitor 322 for smoothing the rectified pulsating flow, and an inverter main circuit 323 connecting six transistors (for example, FET) in three-phase bridges to convert a direct current to a pseudo three-phase alternating current. The inverter device 32 supplies the compressor 22 with a single-phase alternating voltage converted into an alternating current variable in frequency.

The photocoupler made up of the light emitting element 34A and the photo detector element 34B transmits the compressor ON/OFF signal received at the first signal line connector in the outdoor machine side connector terminal 21 to MCU 33, the photocoupler made up of the light emitting element 35A and the photo detector element 35B transmits the outdoor fan ON/OFF signal received at the second signal line connector in the outdoor machine side connector terminal 21 to MCU 33, and the photocoupler made up of the light emitting element 36A and the photo detector element 36B transmits the ON/OFF signal received at the third signal line connector in the outdoor machine side connector terminal 21 for switching the four-way valve to the cooling side or the heating side to MCU 33.

MCU 33 is responsive to the signals transmitted from three photocouplers and a signal from an outdoor refrigerating cycle element, such as temperature sensor 37 for detecting the temperature of an outdoor heat exchanger, to control the inverter main circuit 323, relay contacts 38B and 38C and to control the short-circuiting device 31.

Explained below are operations of the first embodiment having the above-explained structure.

When the compressor ON/OFF signal, the outdoor fan ON/OFF signal and the ON/OFF signal for switching the four-way valve to the cooling side or the heating side are transmitted from the indoor machine 1 via the crossover lines 3 to the outdoor machine 2, these ON/OFF signals are introduced into MCU 33. Then, MCU 33 executed processing from step 101 to step 117 shown in the flow chart of FIG. 2.

That is, in step 101, MCU 33 reviews whether an ON signal has been received from the first signal line for transmitting compressor ON/OFF signals. If the signal is ON, MCU 33 controls the inverter device 32 in step 102 to gradually increase the number of revolutions of the compressor 22, starts a timer 1 having an increase control time preset therein instep 103, and next judges in step 104 whether the preset time $t_{s1}$ has passed or not. If MCU 33 judges that the preset time $t_{s1}$ has passed, it next judges in step 105 whether the real number of revolutions of the compressor 22 has reached an allowable maximum number of revolutions. If not, MCU 33 executes step 106. If it has reached, MCU 33 executes the processing of step 108.

In step 106, MCU 33 stops the control for increasing the number of revolutions of the compressor 22. In the next step 107, it resets the timer 1 and returns to step 103. In step 108, it judges whether the first signal line is in the OFF state or not. If judges it to be OFF, it activates, in step 109, a timer 2 for detecting whether the OFF time reaches a preset value or not, then executes processing for reducing the number of revolutions of the compressor 22 by a predetermined constant value in step 109, and reviews whether the preset time $t_{s2}$ of the timer 2 has passed or not in step 111. If the time has not passed, MCU 33 executes processing of step 112. If the time has passed, MCU 33 executes processing of step 113. In step 112, MCU 33 judges whether the first signal line is in the ON condition or not, and when judging it to be ON, it executes processing of step 103 et seq.

In step 113, MCU 33 judges whether the real number of revolutions of the compressor 22 has reached an allowable minimum number of revolutions or not. If it has not reached, MCU 33 resets the timer 2 in step 114, and thereafter executes the processing of step 109 et seq. If it has reached, MCU 33 maintains the condition for a predetermined time in step 115, and then judges in step 116 whether the first signal line is in the ON condition or not. If MCU 33 judges the condition has become OFF, it executes the processing of step 103 et seq. If the line has not restored the ON condition, i.e., if it maintains the OFF conditions even after driving the compressor 22 for a predetermined time, MCU 33 stops the compressor 22 in step 117, and terminates the processing.

When the compressor ON/OFF signal changes from the OFF state to ON state as a result of execution of the above-explained processing by MCU 33, control is made to gradually increase the number of revolutions of the compressor 22 and at the same time to increase it to the predetermined maximum number of revolutions. When the compressor ON/OFF signal changes from the ON condition to the OFF condition, and the OFF condition continues, control is made to gradually decrease the number of revolutions of the compressor 22 and at the same time to gradually decrease it to the predetermined minimum number of revolutions. Additionally, if the OFF condition is confirmed at the point of time where driving under the minimum number of revolutions lasts for a predetermined time, control is finished at the point of time. Further, also executed is a control for increasing or decreasing the number of revolutions of the compressor 22 depending on the length of the duration time of the ON condition.

Figure 2:
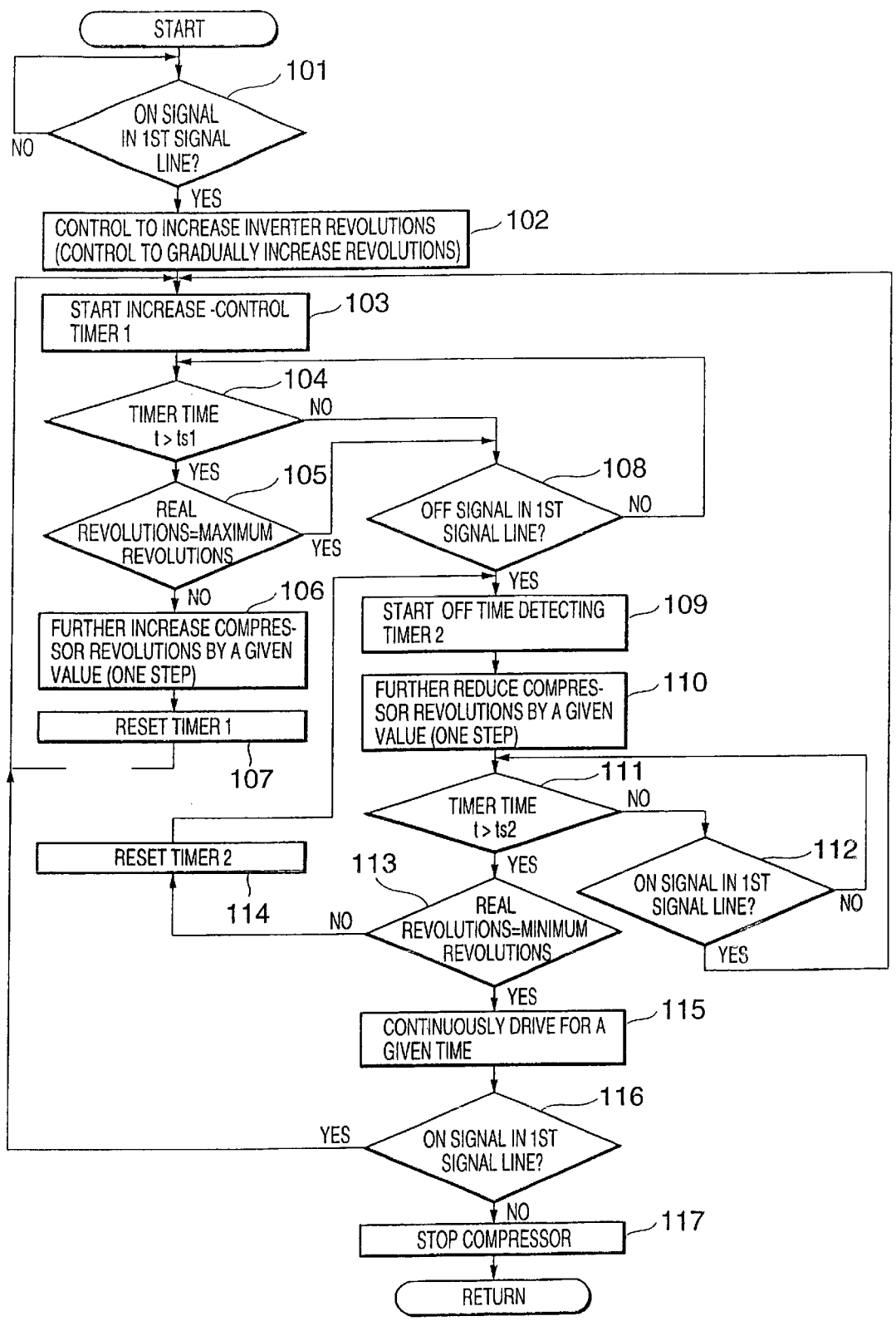
FIG. 2 is a flow chart showing a processing procedure corresponding to one of functions of a microcomputer which is a major component of the first embodiment shown in FIG. 1.

In this manner, by executing the processing shown in FIG. 2 with the structure shown in FIG. 1, it is possible to construct an inverter-type air conditioner by using the indoor machine 1 of a general heat-pump system unchanged, mounting the above-explained outdoor machine drive control unit 30 in the outdoor machine 2 and merely changing the compressor into an inverter-driven-type compressor 22.

Figure 3:
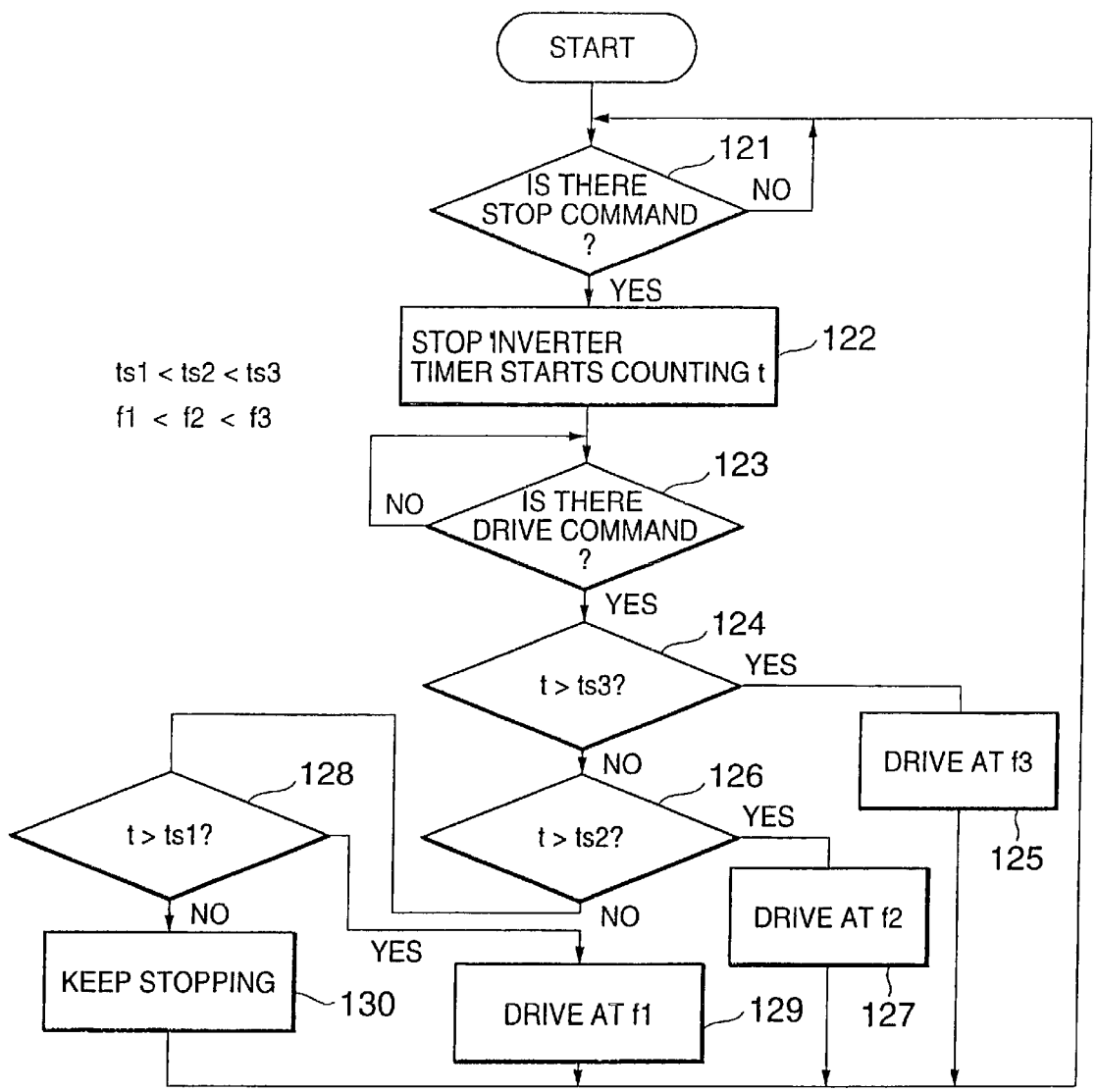
FIG. 3 is a flow chart showing a processing procedure corresponding to another function of the microcomputer which is the major component of the first embodiment shown in FIG. 1.

In the control shown in the flow chart of FIG. 2, the number of revolutions of the compressor is gradually increased from the minimum number of revolutions, for example, when driving thereof is started. It is considered, however, that during repetition of driving and stopping, as the stopping time is the longer, the demanded power is the higher. FIG. 3 is a flow chart showing a processing procedure for changing driving frequency at the start-up if a high power is desired, taking that view into consideration. In this case, in step 121, MCU 33 reviews whether the command instructs stopping or not, i.e., whether the compressor ON/OFF signal has changed from the ON condition to the OFF condition or not. If the command instructs stopping, MCU 33 activates the timer for counting the inverter stopping time in step 122, then reviews in step 123 whether the presence or absence of a driving command, i.e., whether the compressor ON/OFF signal has changed from the OFF condition to the ON condition or not, further reviews in step 124 whether the stopping time t has lasted beyond the maximum preset value $t_{s3}$ in order to increase the driving frequency more when the time t from the stopping command to the driving command is longer. If the time t overpasses, MCU 33 activates the inverter under a relatively high driving frequency $f_3$ in step 125. If the stopping time t is the longest preset value $t_{s3}$ or less, MCU investigates in step 126 whether the stopping time t has passed the intermediate preset value $t_{s2}$. If it exceeds, MCU 33 activates the inverter under the intermediate driving frequency $f_2$ ($<f_3$) in step 127. If the stopping time t is the intermediate preset value $ts_2$ or less, MCU 33 reviews in step 128 whether the stopping time t exceeds the shortest preset value $t_{s1}$. If it exceeds, MCU 33 activates the inverter under the minimum driving frequency $f_1$ ($<f_2$) in step 129. If the stopping time t is the shortest preset value $t_{s1}$ or less, MCU 33 holds the drive stopping condition in step 130, and returns to the processing of step 121. Driving frequencies $f_3$, $f_2$ and $f_1$ in this case are set in values nearer to the minimum number of revolutions than the intermediate value of the control region from the maximum number of revolutions to the minimum number of revolutions of the compressor explained above.

Figure 4:
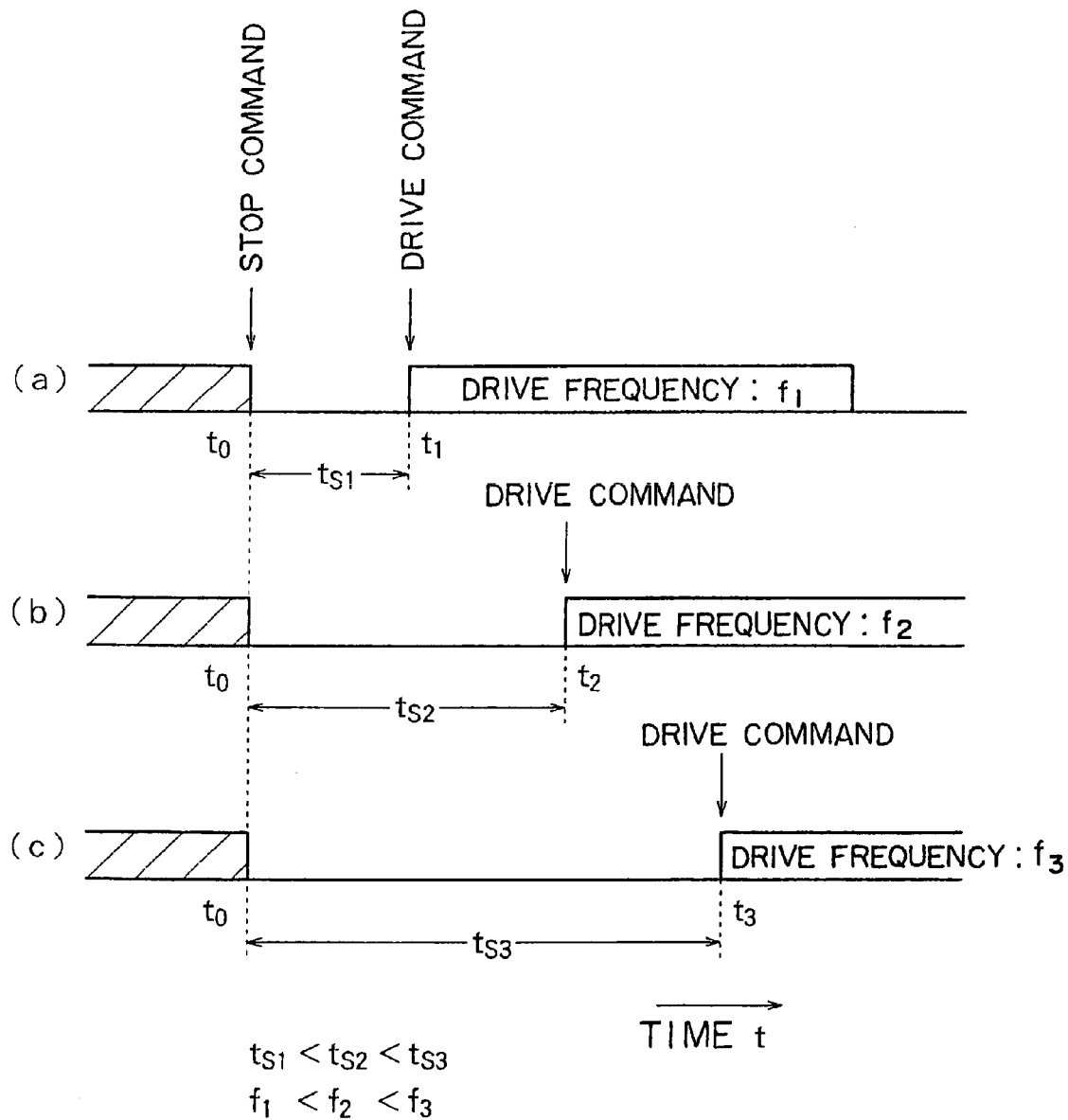
FIG. 4 is a time chart showing relation between the stopping time and the drive frequency corresponding to the processing procedure of the microcomputer shown in FIG. 3.

FIG. 4 shows a time chart at (a), (b) and (c), which shows that relation. If the time, from time $t_0$ where the stopping command is received to the time t where the driving command is received, is in the range of $t_{s1}<t<t_{s2}$, then MCU 33 activates the inverter at the driving frequency $f$,. If it is in the range of $t_{s2}<t<t_{s3}$, MCU 33 activates the inverter at the driving frequency of $f_2$. If it overpasses $t_{s3}$, MCU 33 activates the inverter at the driving frequency of $f_3$.

In this manner, it is possible to activate the inverter under a frequency meeting the required power by executing the processing shown in FIGS. 3 and 4 and to prevent discontinuous driving.

On the other hand, the temperature of the refrigeration cycle parts represented by the outdoor heat exchanger comes to largely differ from the preset temperature as the air conditioning load increases. Therefore, by detecting temperatures of refrigeration cycle parts and increasing the driving frequency of the inverter for driving the compressor so much as the difference from the preset temperature becomes large to decrease the temperature difference, efficient driving for bringing the room temperature closer to the preset value is enabled.

The temperature sensor 37 shown in FIG. 1 detects the temperature of the outdoor heat exchanger as one of refrigeration cycle parts, and delivers the detected temperature $T_j$ to MCU 33. An appropriate target temperature $T_{cy}$ corresponding to each driving mode for cooling and heating is preset in MCU 33, and MCU 33 has the function of executing the processing of FIG. 5 on the basis of these detected temperature Ti and the target temperature $T_{cy}$.

That is, assume that MCU 33 judges in step 131 that the ON signal is received from the first signal line for transmitting the compressor ON/OFF signals. Then, instep 132, MCU 33 controls the driving frequency of the inverter device 32 to gradually increase the number of revolutions of the compressor 22. In step 133, it detects a temperature difference ΔT between the detected temperature $T_j$ of the outdoor heat exchanger as one of refrigeration cycle parts and the preset target temperature $T_{cy}$ ($\Delta T = T_{cy} - T_j$ in the cooling mode and $\Delta T = |T_{cy} - T_j|$ in the heating mode). Subsequently, in step 134, MCU 33 judges whether the temperature difference ΔT is smaller than a target temperature difference $\Delta T_{s0}$ or not. If it judges the temperature difference ΔT is smaller than the target temperature difference $\Delta T_{s0}$, MCU 33 stops the compressor 22 in step 135. In contrast, if it judges the temperature difference ΔT is equal to or larger than the target temperature difference $\Delta T_{s0}$, MCU 33 next judges in step 136 whether the temperature difference ΔT is smaller than a target temperature difference $\Delta T_{s1}$ ($>\Delta T_{s0}$) or not. If it judges the temperature difference ΔT is smaller than the target temperature difference $\Delta T_{s1}$, MCU 33 stops the control for increasing the number of revolutions of the inverter 22 in step 137, and drives the inverter device 32 at the frequency $f_1$. In contrast, if it judges the temperature difference ΔT is equal to or larger than the target temperature difference $\Delta T_{s1}$, MCU 33 next judges in step 138 whether the temperature difference ΔT is smaller than a target temperature difference $\Delta T_{s2}$ ($>\Delta T_{s1}$) or not. If it judges the temperature difference ΔT is smaller than the target temperature difference $T_{s2}$, MCU drives the inverter device 32 at the frequency $f_2$ in step 139. In contrast, if it judges the temperature difference ΔT is equal to or larger than the target temperature difference $\Delta T_{s1}$, MCU 33 drives the inverter device 32 at the frequency of $f_3$ in step 140. Next, MCU 33 judges in step 141 whether the OFF signal has been received from the first signal line or not. If it has been received, MCU 33 stops operation of the inverter device 32 to stop the compressor 22 in step 142. If it has not been received, MCU 33 executes the processing of step 133 et seq.

Figure 6:
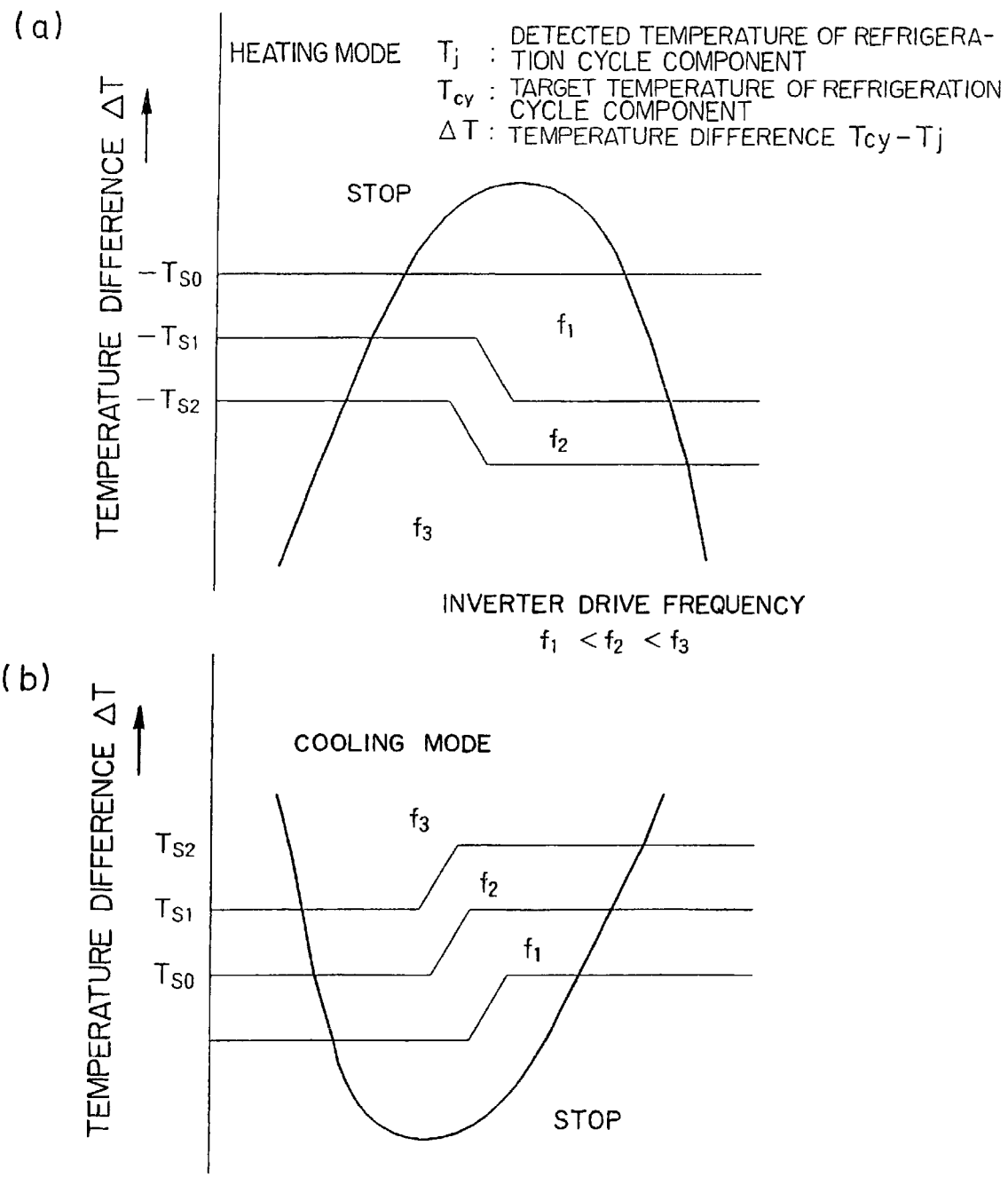
FIG. 6 is a graph showing relation between the temperature difference and the drive frequency corresponding to the processing procedure of the microcomputer shown in FIG. 5.

Once these procedures are executed, the driving frequency f of the inverter device 32 changes when the temperature difference ΔT changes. FIG. 6 shows at (a) changes in driving frequency f responsive to changes in temperature difference ΔT when compressor is driven in the heating mode, and shows at (b) changes in driving frequency f responsive to changes in temperature difference ΔT when the compressor is driven in the cooling mode. In any of these driving modes, a difference is made between values of the temperature difference ΔT while it decreases and values of the temperature difference ΔT while it increases so that frequent fluctuation in frequency be prevented. At the same time, the driving frequency f is increased as the temperature difference increases, and driving is stooped when it decreases below the minimum target temperature difference $\Delta T_{s1}$.

Figure 5:
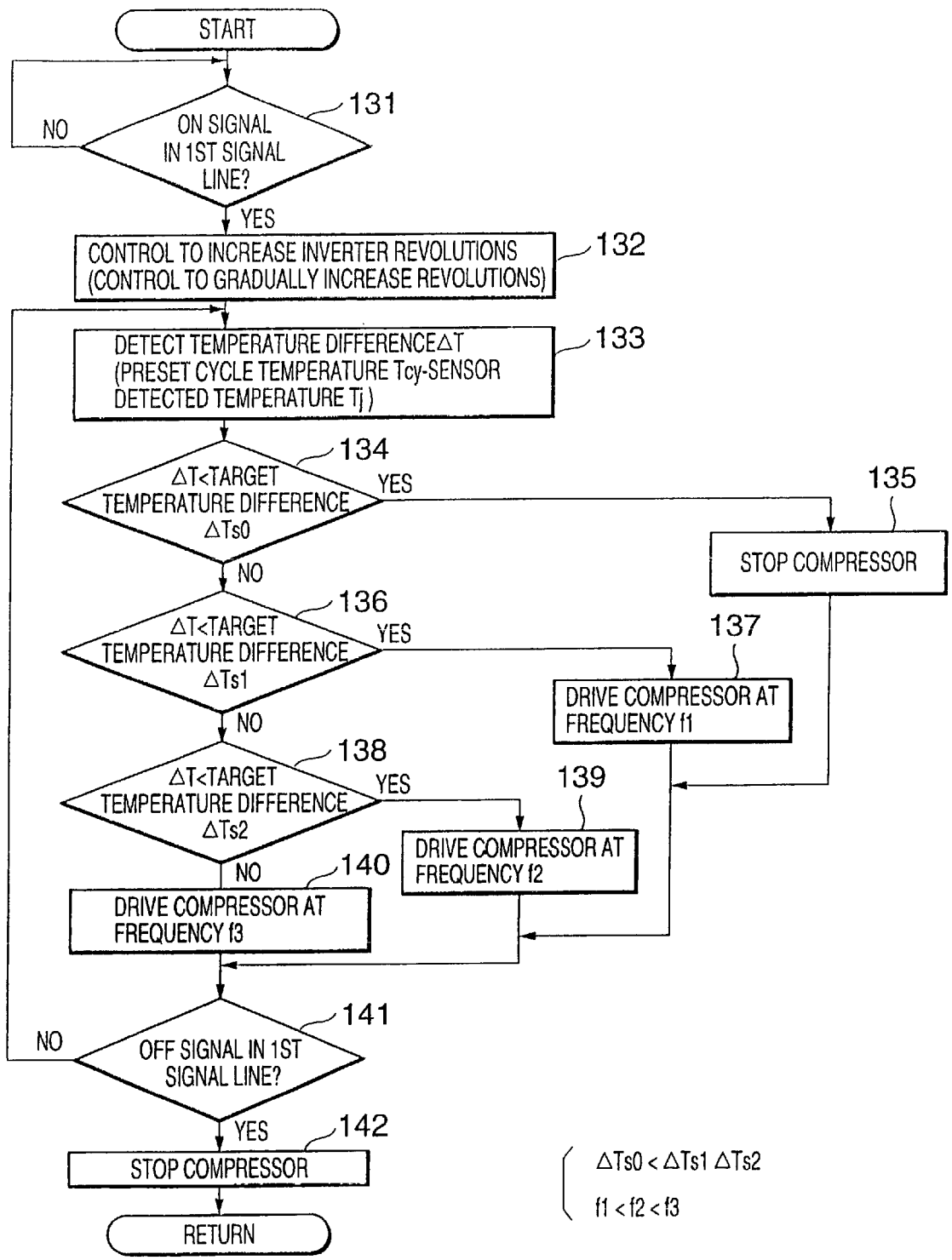
FIG. 5 is a flow chart showing a processing procedure corresponding to another function of the microcomputer which is the major component of the first embodiment shown in FIG. 1.

In this manner, by executing the processing as explained by using FIG. 5 and FIG. 6, it is possible to construct an inverter-type air conditioner by using the indoor machine of a general heat-pump system unchanged, mounting the above-explained outdoor machine drive control unit in the outdoor machine and merely changing the compressor into an inverter-driven-type compressor.

Figure 7:
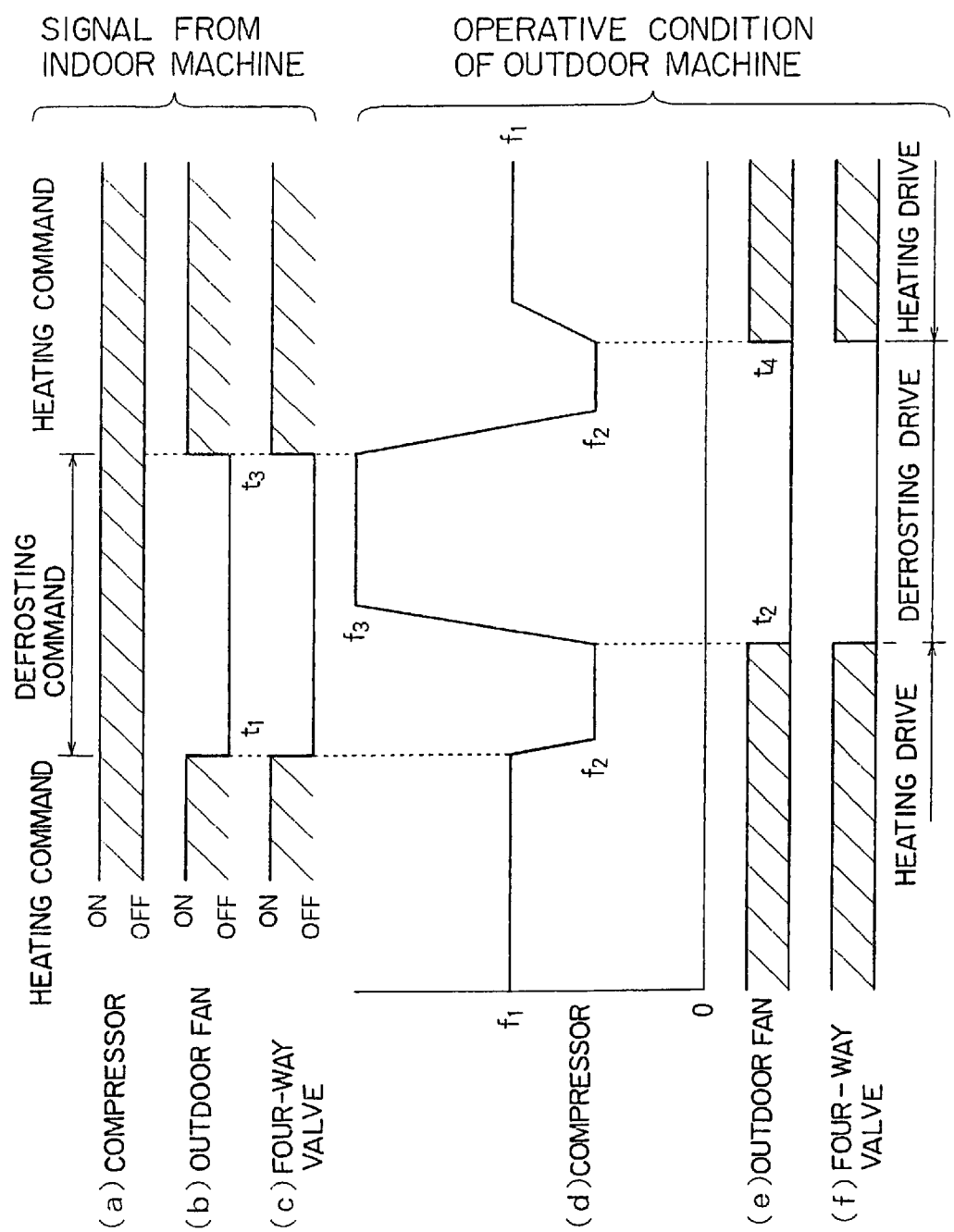
FIG. 7 is a time chart showing relation between the received signal and the actual operative condition corresponding to the processing procedure of the microcomputer shown in FIG. 5.

A general heat-pump-type air conditioners drives in a defrosting mode by transmitting ON/OFF signals to its outdoor machine such as combinations shown at (a), (b) and (c) in FIG. 7 when it is frosted during driving in the heating mode. MCU 33 in the outdoor machine drive control unit 30 shown in FIG. 1 executes controls shown at (d), (e) and (f) in FIG. 7.

That is, in order to switch the air conditioner to the defrosting driving mode at time $t_1$, the outdoor fan ON/OFF signal is changed from the ON condition to the OFF condition and the four-way valve ON/OFF signal is changed from the ON condition to the OFF condition while holding the compressor ON/OFF signal in the ON condition. On the other hand, MCU 33 recognizes from combination of these ON/OFF signals that the command has changed from the heating command to the defrosting command, and decreases the driving frequency of the inverter heretofore driving the compressor from $f_1$ to $f_2$ ($<f_1$). This is the control for preventing that a large switching noise is generated due to fluctuation in pressure of the refrigerant when the four-way valve is switched immediately after the command is changed from the heating command to the defrosting command. By this control, the pressure difference between the refrigerant discharge side and the refrigerant suction side viewed from the compressor. After driving the compressor 22 at the frequency $f_2$ for a predetermined time, MCU 33 increases the driving frequency of the compressor from $f_2$ to $f_3$ ($>f_1$) at time $t_2$1 stops the outdoor fan 23, and switches the four-way valve 25 to the cooling side. As a result, highly efficient defrosting driving is performed. When the command is changed from the defrosting command to the heating command at time $t_3$, MCU 33 again decreases the driving frequency of the compressor from $f_3$ to $f_2$ to reduce the switching noise of the four-way valve, then returns the driving frequency of the compressor to $f_1$ at time $t_4$ later by a predetermined time, drives the outdoor fan 23, and switches the four-way valve 25 to the heating side.

Figure 8:
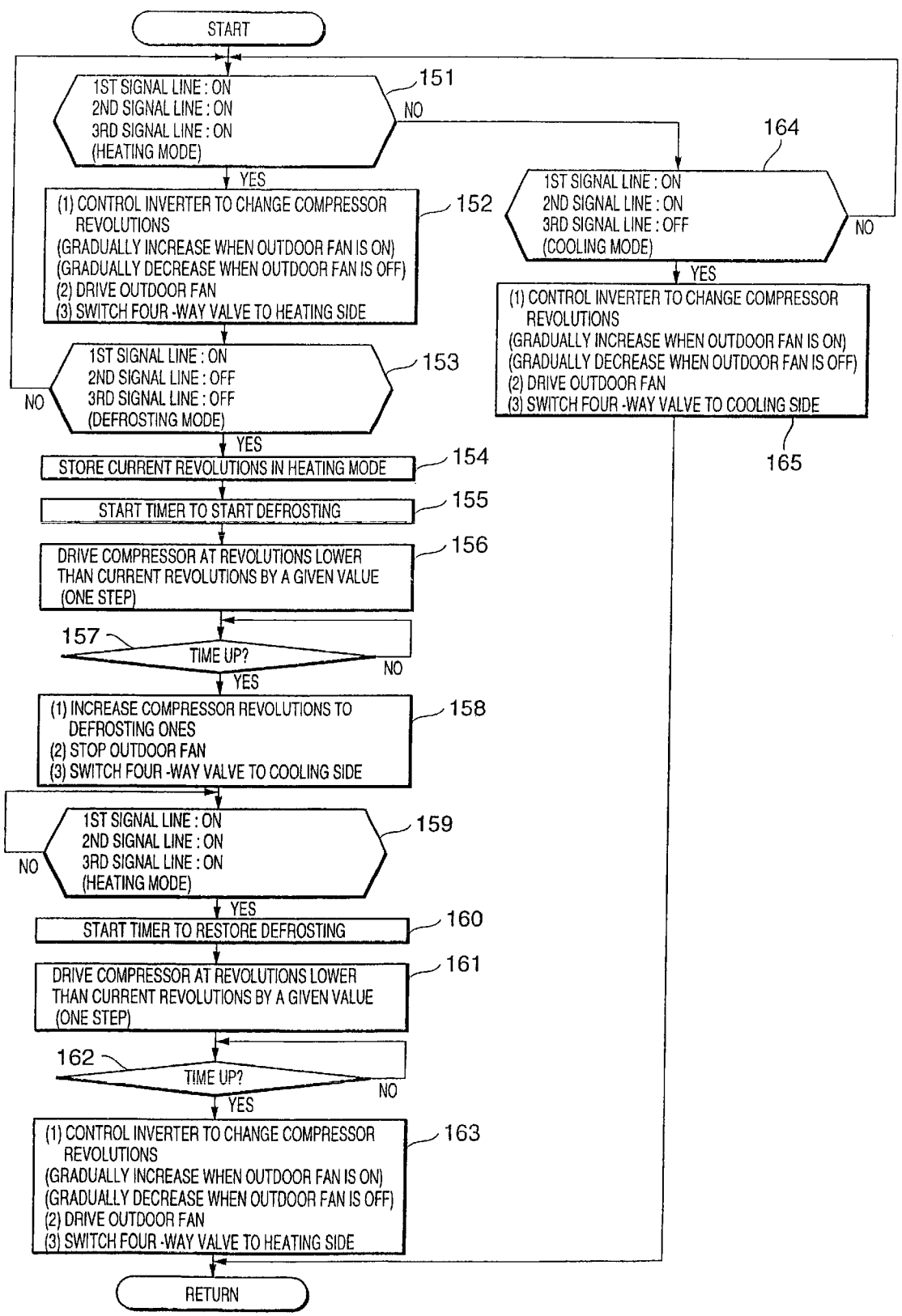
FIG. 8 is a flow chart showing a processing procedure corresponding to another function of the microcomputer which is the major component of the first embodiment shown in FIG. 1.

FIG. 8 is a flow chart showing a concrete processing procedure of MCU 33 executing these controls. That is, in step 151, it judges whether the air conditioner is in the heating mode where all of the ON/OFF signals in the first, second and third signal lines exhibit ON conditions or not. When judging it to be in the heating mode, MCU 33 increases or decreases the driving frequency of the compressor in response to the condition of the outdoor fan ON/OFF signal in step 152, at the same time drives the outdoor fan 23, and maintains the four-way valve 25 on the heating side to continue the heating drive. In step 153, MCU 33 judges whether the mode is the defrosting mode or not from the fact that ON/OFF signals of the second and third signal lines among the first, second and third signal lines have changed to the OFF conditions, i.e., the status where the outdoor fan is stopped and the four-way valve is changed to the cooling side. If it judges the mode is not the defrosting mode, it returns to the processing of step 151. If it judges the mode is the defrosting mode, it stores the current driving frequency of the compressor in step 154.

Then, in step 155, it activates the timer for counting the defrosting start time, then decreases the driving frequency of the compressor by one step in step 156, waits the preset time of the timer lapses in step 157, then proceeds to the processing of step 158 to increase the driving frequency of the compressor to the defrosting frequency, simultaneously stops the outdoor fan 23, and switches the four-way valve 25 to the cooling side. After that, it judges in step 159 whether the air conditioner has returned or not to the heating mode where all of the ON/OFF signals in the first, second and third signal lines exhibit ON conditions. If it judges the mode is the heating mode, it activates the timer for counting the defrosting return-back time in step 160, decreases the driving frequency of the compressor from the frequency stored just before changing to the defrosting drive by one step in step 156, waits the preset time of the timer matures in step 162, then proceed to the processing of step 163. In step 163, MCU 33 increases or decreases the driving frequency of the compressor, depending on the condition of the outdoor fan ON/OFF signal, at the same time drives the outdoor fan 23, and switches the four-way valve 25 to the heating side to change the air conditioner to the heating drive mode.

On the other hand, if MCU 33 judges in step 151 that the mode is other than the heating mode, it judges in step 164 whether it is the cooling mode or not. If it is the cooling mode, MCU 33 increases or decreases the driving frequency of the compressor depending upon the condition of the outdoor fan ON/OFF signal, at the same time drives the outdoor fan 23, and hold the four-way valve 25 on the cooling side to continue the driving.

In this manner, by executing the processing explained by using FIGS. 7 and 8, defrosting driving similarly to that heretofore executed by an inverter-type air conditioner can be realized.

Figure 9:
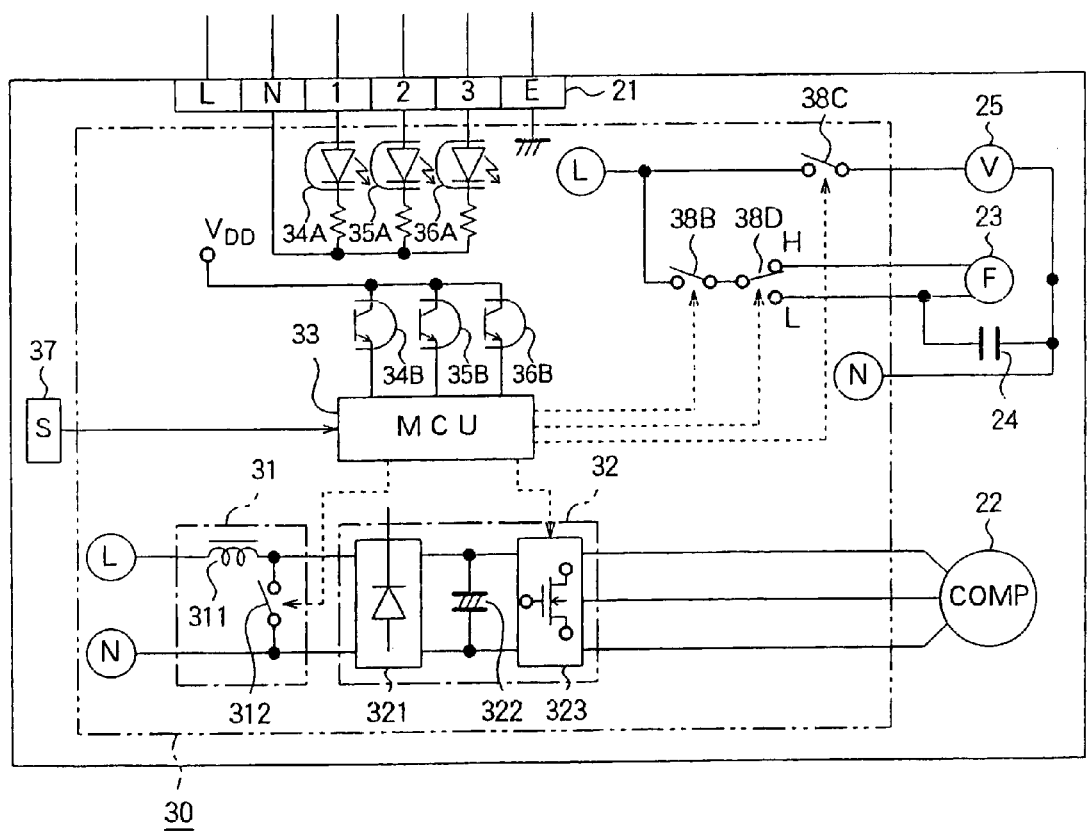
FIG. 9 is a control circuit diagram in the case where a second embodiment of the outdoor machine drive control unit in an air conditioner according to the invention is mounted in an outdoor machine.

FIG. 9 is a circuit diagram in which the second embodiment of the outdoor machine drive control unit for the air conditioner according to the invention is mounted in the outdoor machine 2. In FIG. 9, components common to those of FIG. 1 showing the first embodiment are labeled with common reference numerals, and their explanation is omitted. The embodiment shown here enables two-stepped switching control of the number of revolutions of the outdoor fan 23, and connects between a relay contact 38B and the outdoor fan 23 a relay switching contact 38D arbitrarily movable between a H side for high speed driving and an L side for low speed driving, so that MCU 33 controls to switch it. By enabling two-stepped switching of the rotational speed of the outdoor fan 23, the power control range of the outdoor machine can be expanded more.

Figure 10:
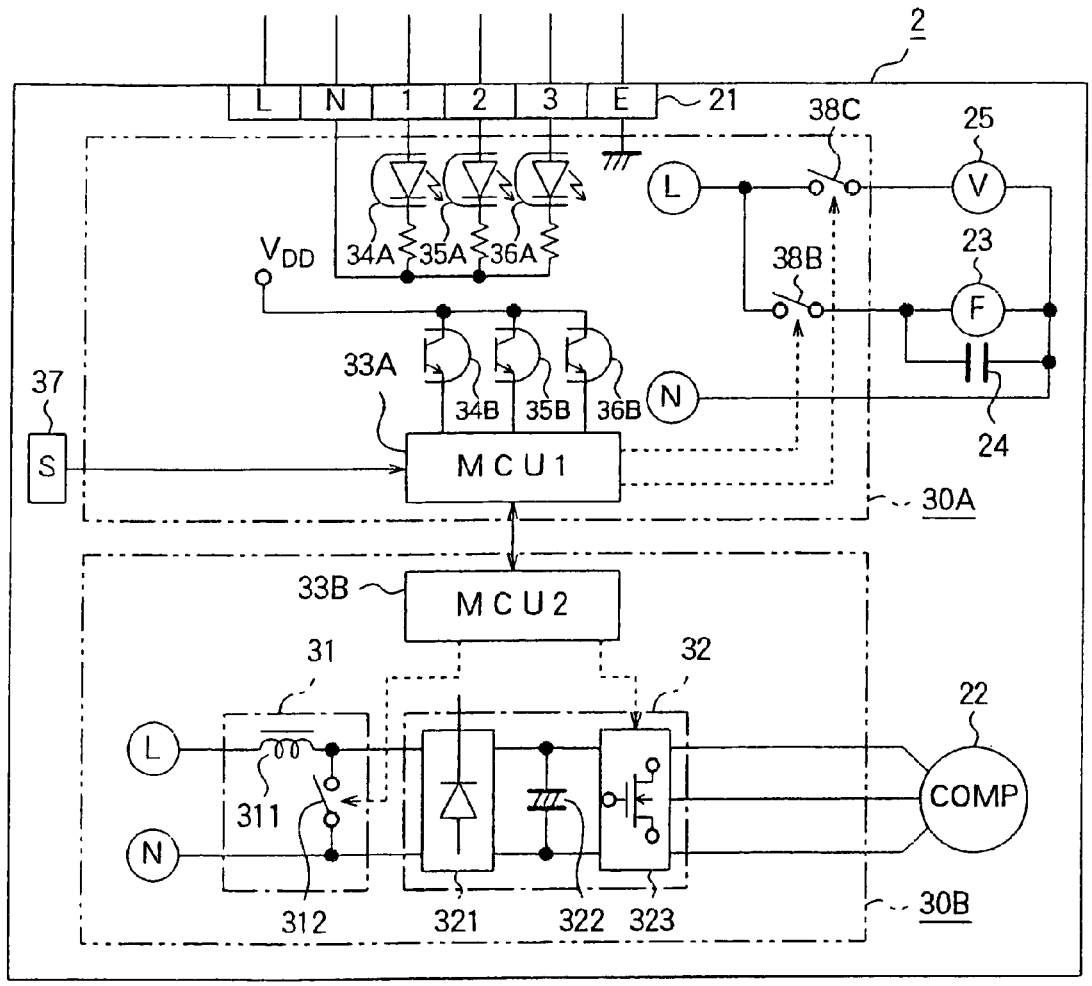
FIG. 10 is a control circuit diagram in the case where a third embodiment of the outdoor machine drive control unit in an air conditioner according to the invention is mounted in an outdoor machine.

FIG. 10 is a control circuit diagram in which the third embodiment of the outdoor machine drive control unit for the air conditioner according to the invention is mounted in the outdoor machine 2. In FIG. 10, components common to those of FIG. 1 showing the first embodiment are labeled with common reference numerals, and their explanation is omitted. The embodiment shown here is characterized in providing two MCUs 33A and 33B to be in charge of divisional parts of the functions of MCU 33 shown in FIG. 1; packaging light emitting elements 34A, 35A, 36A and photo detector elements 34B, 35B, 36B forming photocouplers, relay having relay contacts 38B, 38C, temperature sensor 37 and MCU 33A on a single substrate; and assigning the function of controlling the outdoor fan 23 and the four-way valve 25 to MCU 33A, thereby to construct the refrigeration cycle controller. Additionally, by packaging MCU 33B, short-circuiting device 31 and inverter device 32 on a single substrate, and assigning the function of controlling the short-circuiting device 31 and the inverter device 32 to MCU 33B, this embodiment makes up the inverter controller. MCU 33A is configured to transmit only ON/OFF signals of the first, second and third signal lines to MCU 33B.

By dividing and assembling major components on two substrates, the embodiment is additionally effective in making it much easier to mount them in any of various outdoor machines different in size and configuration.

The general heat-pump-type air conditioner can be also configured to transmit the compressor ON/OFF signal, the ON/OF signal corresponding to the magnitude of the temperature difference between the room temperature and the preset value, and the four-way valve ON/OFF signal from the indoor machine to the outdoor machine and to configure the outdoor machine to drive and control the compressor 22, the outdoor fan 23 and the four-way valve 25 by modifying the outdoor machine control program alone.

Figure 11:
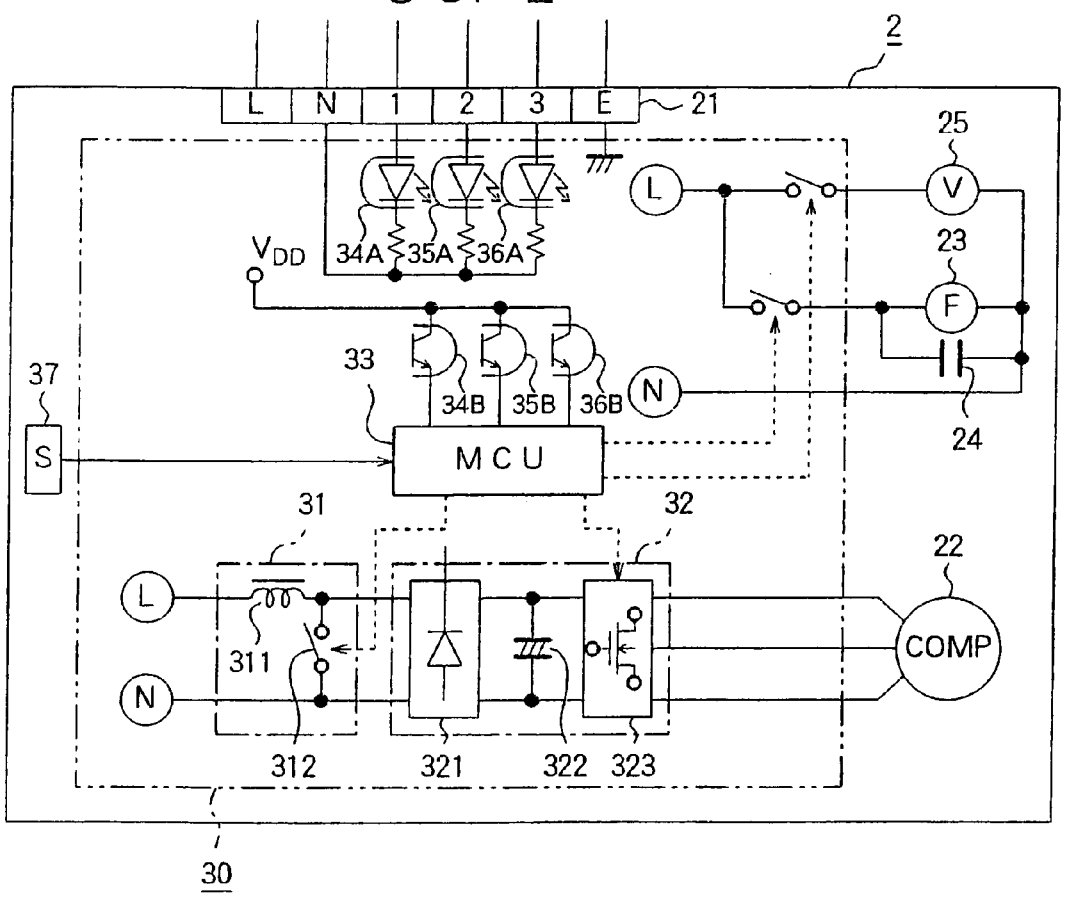
FIG. 11 is a control circuit diagram in the case where a fourth embodiment of the outdoor machine drive control unit in an air conditioner according to the invention is mounted in an outdoor machine.

FIG. 11 is a circuit diagram in which the fourth embodiment applying the invention to an air conditioner of a system partly modifying the outdoor machine control program is mounted the outdoor machine 2. In FIG. 11, components common to those of FIG. 1 showing the first embodiment are labeled with common reference numerals, and their explanation is omitted. The embodiment shown here is different from FIG. 1 merely in introducing an ON/OFF signal corresponding to the magnitude of the temperature difference between the room temperature and the preset value as an information signal to the second signal line connector of the outdoor machine side connector terminal 21 and hence in processing procedure of the MCU 33.

Figure 13:
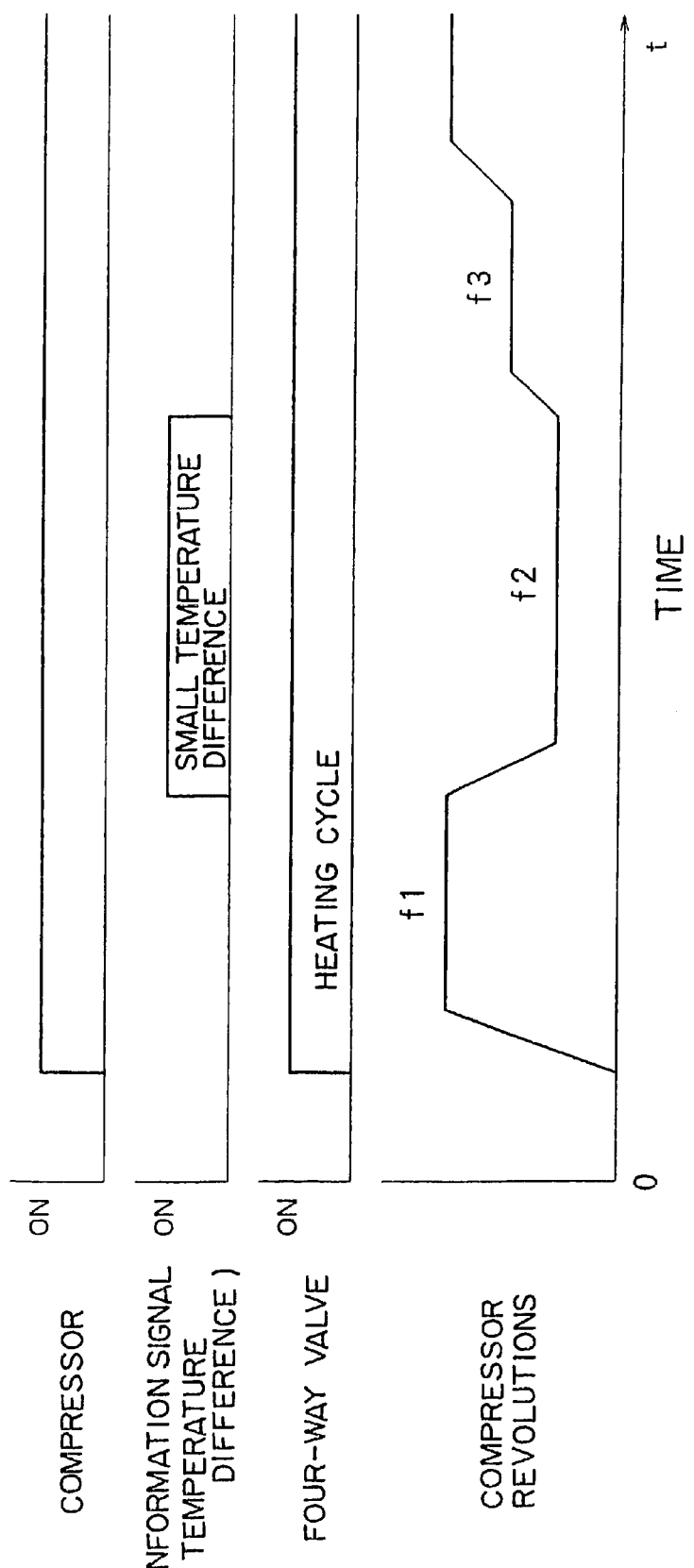
FIG. 13 is a time chart showing the actual operative condition corresponding to the processing procedure of the microcomputer shown in FIG. 11.

FIG. 12 is a flow chart showing a concrete processing procedure of MCU 33 shown in FIG. 11, and FIG. 13 is a time chart corresponding to the processing procedure of FIG. 12. In this case, MCU 33 executes the processing of steps 171 through 186.

That is, in step 171, MCU 33 investigates whether the ON signal has been received or not from the first signal line for transmitting the compressor ON/OFF signals. If it is in the ON condition, MCU 33 controls the inverter device 32 to gradually increase the number of revolutions of the compressor 22 in step 172, starts the timer 1 preset with an increase control time in step 173, and thereafter judges in step 174 whether the preset time $t_{s1}$ has passed or not. If it judges the preset time $t_{s1}$ has passed, it judges in step 175 whether the real number of revolutions of the compressor 22 has reached the allowable maximum number of revolutions or not. If it has not reached, MCU 33 executes the processing of step 176. If it has reached, MCU 33 executes the processing of step 180.

In step 176, it stops the control toward increasing the number of revolutions of the compressor 22, then executes the processing to increase the number of revolutions by a predetermined constant value, resets the timer 1 in the next step 177, and moves to the processing of step 178. In step 178, MCU 33 investigates whether the OFF signal has been received from the first signal line for transmitting the compressor ON/OFF signals. If the condition is the OFF condition, MCU 33 executes the processing to stop the compressor and the outdoor fan and executed other processing. If no OFF signal has been received, MCU 33 executes the processing of step 173 et seq.

On the other hand, if the preset time $t_{s1}$ has not passed in step 174, or if MCU 33 judges in step 175 that the real number of revolutions has reached the maximum number of revolutions, MCU 33 investigates in step 180 whether the ON signal has been received or not from the second signal line. That is, it investigates whether the temperature difference is a predetermined value or less. If it judges that the condition is the OFF condition where the temperature difference is larger than the predetermined value, MCU 33 executes the processing of step 174 et seq. to increase the number of revolutions of the compressor. If the signal is in the ON condition, MCU 33 judges that the temperature difference between the preset value and the room temperature is small, then decreases the number of revolutions of the compressor by a predetermined value (by two steps of the increasing unit) in step 181, and subsequently starts the timer 2 for counting the ON condition time in step 182.

In the next step 183, it judges whether the condition of the second signal line is the OFF condition or not. If it is the ON condition, i.e., if the temperature difference is large, MCU 33 executes the processing of step 177 by increasing the number of revolutions of the compressor by one step in step 184. On the other hand, if it judges that the condition of the second signal line is the ON condition in step 183, i.e., if it judges that the temperature difference is small, MCU 33 judges in step 185 whether the preset time $t_{s2}$ of the timer 2 has passed or not. If it has passed, MCU 33 decreases the number of revolutions of the compressor by one step in step 186, and returns to the processing of step 183. That is, it executes the processing for reducing the number of revolutions of the compressor by one step every time when the preset time of the timer 2 passes.

As a result of the above-explained processing executed by MCU 33, when the compressor ON/OFF signal changes from the OFF condition to the ON condition, the control of gradually increasing the number of revolutions of the compressor 22 is done, and at the same time, the control for increasing it to the predetermined maximum number of revolutions is done. Additionally, when the compressor ON/OFF signal changes from the ON condition to the OFF condition, MCU 33 stops the control of the compressor 22 and the outdoor fan 23, and stops the air conditioning control. Further, when it detects from the condition of the ON/OFF signal from the second signal line corresponding to the temperature difference that the difference between the room temperature and the preset temperature is not larger than the predetermined value, it executes the control for reducing the number of revolutions of the compressor by a predetermined value. After that, when it detects that the difference between the room temperature and the preset temperature is larger than the predetermined value, it controls to increase the number of revolutions of the compressor by a predetermined value.

FIG. 14 is a circuit diagram in which the fifth embodiment of the outdoor machine drive control unit of the air conditioner according to the invention is mounted in the outdoor machine of a multi-type air conditioner. In FIG. 14, components common to those of FIG. 1 showing the first embodiment are labeled with common reference numerals, and their explanation is omitted. Here are two indoor machines 1A and 1B are connected to a single outdoor machine 2. The outdoor machine 2 includes a first outdoor machine side connector terminal 21A for connecting signal lines of the indoor machine 1A, and a second outdoor machine side connector terminal 21B connecting signal lines of the indoor machine 1B. The outdoor machine drive control unit 30 is configured to input respective signal to MCU 33 via photocouplers, of which the number is corresponding to that of the signal line connectors in the outdoor machine side connector terminals 21A and 21B. In this case, MCU 33 makes computation of the air conditioning load in response to the ON/OFF conditions of the signals in respective signal line connectors, and executes the processing substantially equal to that of FIG. 2 in a general view.

In this manner, with the structure shown in FIG. 14, it is possible to construct an inverter-type air conditioner by using the indoor machine of a general heat-pump system unchanged, mounting the above-explained outdoor machine drive control unit in the outdoor machine and merely changing the compressor into an inverter-driven-type compressor.

Figure 15:
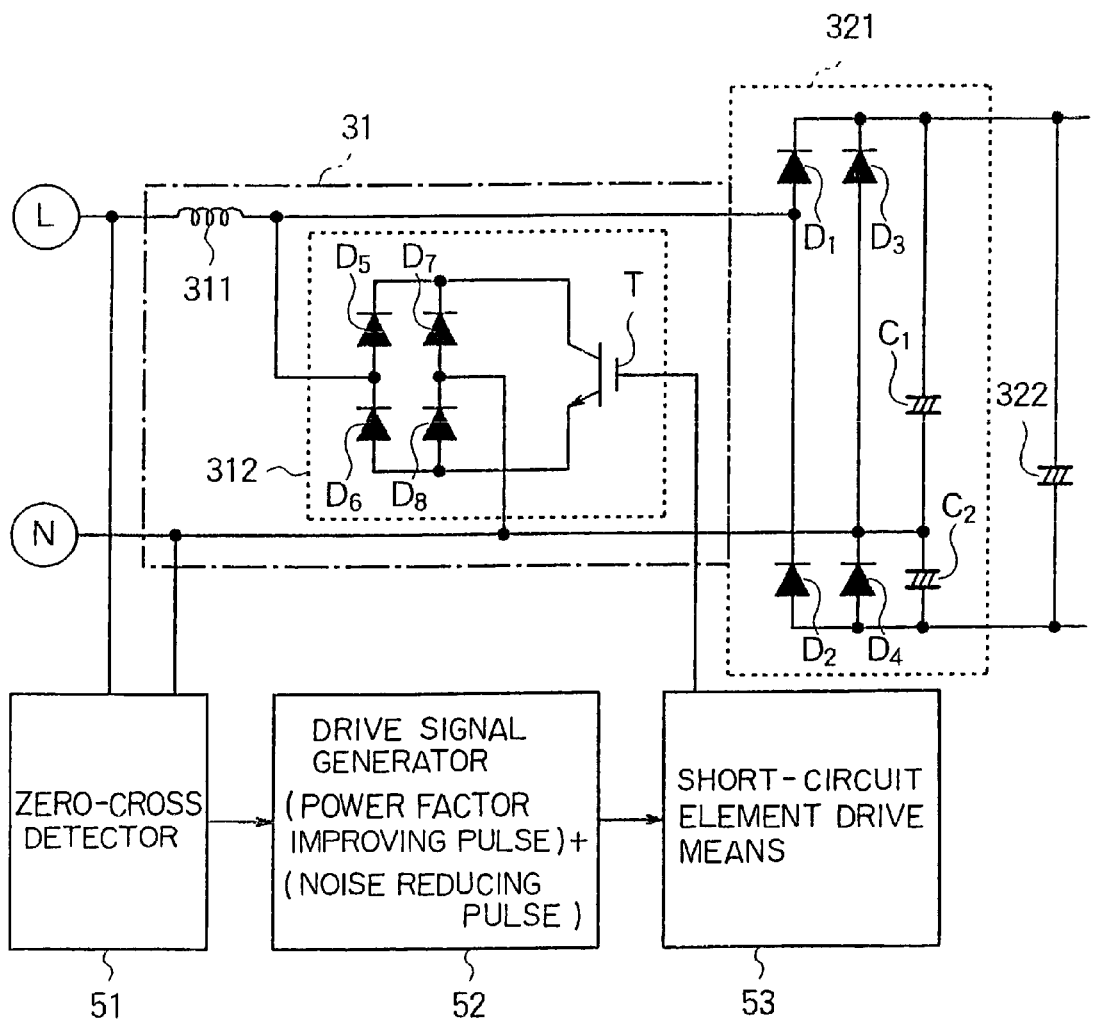
FIG. 15 is a circuit diagram showing detailed structures of a short-circuiting device, its controller, rectifier and smoother of an inverter device, which are major components of the first to fifth embodiments of the outdoor machine drive control unit in an air conditioner according to the invention.

FIG. 15 is a circuit diagram showing a detailed structure of the short-circuiting device 31, its controller, rectifier and smoother of the inverter device 32 shown in the foregoing embodiments. In the rectifier circuit 321, a serially connected circuit of diodes D, $D_2$ and a serially connected circuit of diodes $D_3$, $D_4$ are connected in parallel, a serially connected circuit of capacitors $C_1$, $C_2$ is further connected in parallel, and an inter-connection point of the capacitors $C_1$, $C_2$ is connected to the inter-connection point of the diodes $D_3$, $D_4$.

On the other hand, the short-circuiting device 31 includes a reactor 311 and a switching circuit 312. One of the reactor 311 is connected to the power line connector L in the outdoor machine side connector terminal 21, and the other end of the reactor 311 is connected to the inter-connection point of the diodes $D_1$, $D_2$ forming the rectifier circuit 321. Consequently, the power line connector N in the outdoor side connector terminal 21 is connected to the inter-connection point of the diodes $D_3$, $D_4$. The switching circuit 312 includes a serially connected circuit of diodes $D_5$ and $D_6$ and a serially connected circuit of diodes $D_7$ and DB, which are connected in parallel to form a diode bridge circuit. Among them, the inter-connected point of the diodes $D_5$ and $D_6$ is connected to the load side of the reactor 311, and the inter-connected point of the diodes $D_7$ and $D_8$ is connected to the power line connector N. Further, at opposite ends of the parallel connection of the serially connected circuit of the diodes $D_5$ and $D_6$ and the serially connected circuit of the diodes $D_7$ and $D_8$, collector and emitter of a transistor T are connected.

For the purpose of ON/OFF control of the transistor T, a zero cross detector means 51, drive signal generating means 52 and short-circuit element drive means 53 are provided. Among them, the zero cross detector means 51 may be a photocoupler or a current transducer, for example, and it is configured to detect a zero point of an a.c. voltage and supply a detected signal to the drive signal generating means 52. A function of the drive signal generating means 52 is realized by the MCU 33, and it is configured to generate a power factor improving pulse and a noise reducing pulse having a width much smaller than the power factor improving pulse and to deliver them to the short-circuit element drive means 53. The short-circuit element drive means 53 are responsive to these power factor improving pulse and noise reducing pulse to turn the transistor T ON and thereby short-circuit the a.c. source via the switching circuit 312.

Explained below are operations of the short-circuiting device 31, its controller, rectifier and smoother of the inverter device 32 shown in FIG. 15 with reference to the waveform diagram of FIG. 16. When an a.c. voltage of 100 V is supplied between the power line connectors L and N, the a.c. voltage undergoes voltage doubling rectification and smoothing by a voltage doubling rectifying circuit made up of the diodes $D_1$, $D_2$, capacitors $C_1$, $C_2$ and smoothing capacitor 322. That is, in the duration where the power line connector L is positive relative to the power line connector N, a current flows in the route of power line connector L→reactor 311→diode $D_1$→capacitor $C_1$. →power line connector N, and the capacitor $C_1$ is charged thereby. In the duration where the power line connector N is positive relative to the power line connector L, a current flows in the route of power line connector N→capacitor $C_2$→diode $D_2$→reactor 311→power line connector L, and the capacitor $C_2$ is charged thereby. Therefore, the smoothing capacitor 322 is charged by the sum voltage of the voltage across the opposite ends of the capacitor C, and the voltage across the opposite ends of the capacitor $C_2$, and a d.c. voltage of approximately 280 V is supplied to the subsequent inverter main circuit 323.

The diode $D_3$ forming the rectifier circuit 321 makes up a discharge circuit for preventing the capacitor $C_1$ from being charged in the opposite polarity during initial charge of the capacitor $C_2$. Similarly, the diode $D_4$ form a discharge circuit for preventing the capacitor $C_2$ from being charged in the opposite polarity during initial charge of the capacitor $C_1$.

Figure 16:
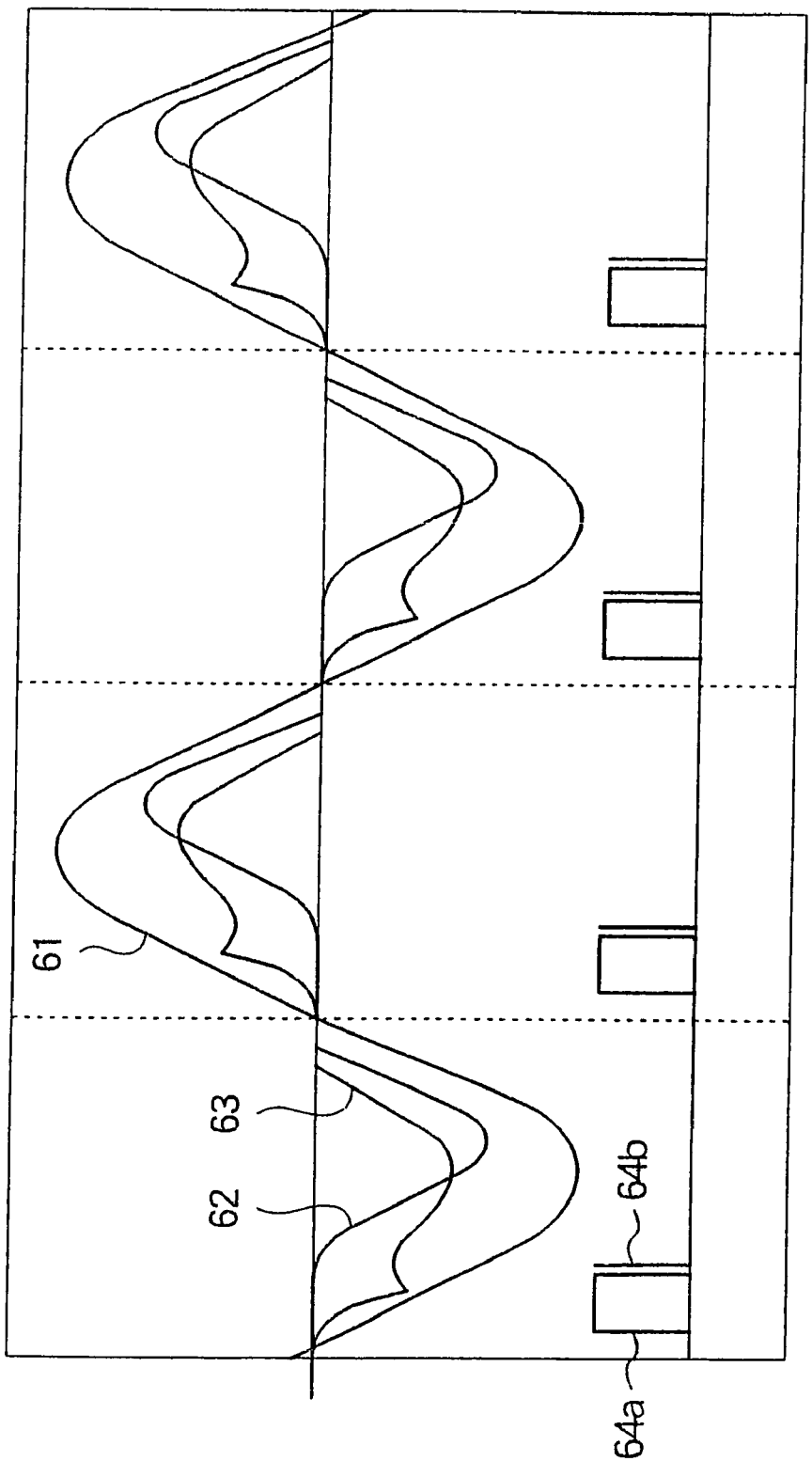
FIG. 16 is a waveform diagram for explaining operations of the major components shown in FIG. 14.

At that time, an a.c. voltage having a sinusoidal waveform as shown by numeral 61 in FIG. 16 is supplied between the power line connectors L and N. The zero cross detector means 51 detects a zero cross point where the a.c. voltage is zero. The drive signal generating means 52 is driven by the detected signal.

When driven by the zero point detection signal from the zero cross detector means 51, the drive signal generating means 52 generates a power factor improving pulse 64*a* and a noise reducing pulse 64*b*, both shown in FIG. 16, after passing the zero point of the a.c. source. In response to the power factor improving pulse 64*a* and the noise reducing pulse 64, the short-circuit element drive means 53 turn the transistor T ON. As a result, not only expanded is the source current supply period, but also improved is the power factor. Additionally, when the short-circuit element drive means 53 turns the transistor T ON in response to the noise reducing pulse 64*b*, it is possible to reduce noise upon removal of the short-circuiting current as a result of canceling the short circuit of the reactor 311.

More specifically, with respect to the source current waveform before improvement of the power factor as shown by numeral 62 in FIG. 16, the source current waveform after improvement of the power factor by the power factor improving pulse 64*a* is expanded in source current supply period as shown by numeral 63, and this shows that the source power factor is certainly improved. Then, by outputting the noise reducing pulse 64*b* having a very small pulse width subsequently to the power factor improving pulse 64*a*, unpleasant noise sounding "zee" generated from the reactor upon removal of the short-circuiting current as a result of short-circuiting the reactor 311 can be reduced without substantially no adverse affection to the source current waveform and the source power factor.

It is also acceptable to generate the power factor improving pulse 64*a* and the noise reducing pulse 64*b* in the opposite sequence. Alternatively, if the noise reducing pulse 64 is generated twice before and after the power factor improving pulse 64*a*, noise can be reduced more reliably. Each of the power improving pulse 64*a* and the noise reducing pulse 64*b* need not be a single pulse. For example, it is also acceptable to generate two noise reducing pulses 64*b* before or after one power improving pulse 64*a*, or to generate one or more noise reducing pulses 64*b* before or after two consecutive power factor improving pulses 64*a*.

As explained above, by incorporating the short-circuiting means explained with reference to FIG. 15 and FIG. 16 in the outdoor machine drive control unit 30, the source power factor is improved, and unpleasant noise caused by short-circuit of the reactor is prevented.

Industrial applicability as apparent from the foregoing description, the outdoor machine drive control unit of an air conditioner according to the invention can construct an inverter-type air conditioner by using a general heat-pump-type indoor machine unchanged and merely mounting it in an outdoor machine.

What is claimed is:

1. An outdoor machine drive control unit for an air conditioner of a separate type having a signal line connector provided in an outdoor machine to receive an ON/OFF signal for a compressor exclusively, comprising:
    an inverter device for supplying said compressor with power variable in frequency; and
    a control device for controlling said inverter device to gradually increase the number of revolutions of said compressor when said ON/OFF signal for the compressor received through said signal line connector changes from the OFF condition to the ON condition.

2. The outdoor machine drive control unit for an air conditioner according to claim 1 wherein said control device has the function of controlling said inverter device to gradually decrease the number of revolutions of said compressor.

3. The outdoor machine drive control unit for an air conditioner according to claim 1 wherein said control device has the function of controlling said inverter device to decrease the number of revolutions of said compressor to a minimum number of revolutions which is lower than a preset number of revolutions by a predetermined value.

4. The outdoor machine drive control unit for an air conditioner according to claim 3 wherein said control device makes the number of revolutions of said compressor to decrease gradually when it makes same to decrease to said minimum number of revolutions.

5. The outdoor machine drive control unit for an air conditioner according to claim 1 wherein said control device includes a power converter means for converting an a.c. voltage from an a.c. power source into a d.c. voltage, a reactor connected in series to one end of said power converter means nearer to said a.c. power source, and a short-circuiting means for short-circuiting said a.c. power source near a zero cross point of an a.c. voltage waveform via said reactor for a predetermined period.

6. The outdoor machine drive control unit for an air conditioner according to claim 1 wherein said control device includes a power converter means for converting an a.c. voltage from an a.c. power source into a d.c. voltage, a reactor connected in series to one end of said power converter means nearer to said a.c. power source, and a short-circuiting means for short-circuiting said a.c. power source near a zero cross point of an a.c. voltage waveform via said reactor for a first predetermined period and immediately thereafter short-circuiting same for a second predetermined period shorter than said first predetermined period.

7. An outdoor machine drive control unit for an air conditioner of a separate type having a signal line connector provided in an outdoor machine to receive an ON/OFF signal for a compressor exclusively, comprising:
    an inverter device for supplying said compressor with power variable in frequency; and
    a control device for controlling said inverter device to increase the number of revolutions of said compressor to a preset number of revolutions when said ON/OFF signal for the compressor received through said signal line connector changes from the OFF condition to the ON condition.

8. An outdoor machine drive control unit for an air conditioner of a separate type having a signal line connector provided in an outdoor machine to receive an ON/OFF signal for a compressor exclusively, comprising:

an inverter device for supplying said compressor with power variable in frequency; and a control device including a timer means for cumulatively counting the duration of time of the ON condition after said ON/OFF signal for the compressor changes from the OFF condition to the ON condition so as to increase or decrease the number of revolutions of said compressor depending on the length of said duration of time of the ON condition.

9. An outdoor machine drive control unit for an air conditioner of a separate type having a signal line connector provided in an outdoor machine to receive an ON/OFF signal for a compressor exclusively, comprising:

an inverter device for supplying said compressor with power variable in frequency; and a control device including a timer means for cumulatively counting the duration of time of the OFF condition since said ON/OFF signal for the compressor changes from the OFF condition to the ON condition until returning to the ON condition, so as to increase or decrease the number of revolutions of said compressor after returning to the ON condition, depending on the length of said duration of time of the OFF condition.

10. The outdoor machine drive control unit for an air conditioner according to claim 9 wherein said control device controls said inverter device to increase the number of revolutions of said compressor when said duration of time of the OFF condition exceeds a preset value.

11. The outdoor machine drive control unit for an air conditioner according to claim 10 wherein said preset value includes a plurality of values different in magnitude.

12. An outdoor machine drive control unit for an air conditioner of a separate type having a signal line connector provided in an outdoor machine to receive an ON/OFF signal for a compressor exclusively, comprising:

an inverter device for supplying said compressor with power variable in frequency;

a temperature sensor for detecting temperature of a refrigeration cycle component provided in said outdoor machine; and a control device for controlling said inverter device to increase or decrease the number of revolutions of said compressor in response to the temperature of the refrigeration cycle component detected by said temperature sensor when the ON/OFF signal for the compressor exhibits the ON condition.

13. The outdoor machine drive control unit for an air conditioner according to claim 12 wherein said control device controls said inverter device to decrease the difference between the detected temperature of the refrigeration cycle component and a preset reference temperature.

14. An outdoor machine drive control unit for an air conditioner of a separate type having a first signal line connector for receiving an ON/OFF signal for a compressor exclusively, a second signal line connector for receiving an ON/OFF signal for an outdoor fan exclusively, and a third signal line connector for receiving an ON/OFF signal for switching a four-way valve to a cooling side or a heating side exclusively, which are provided in an outdoor machine, comprising:

an inverter device for supplying said compressor with power variable in frequency; and a control device including a microcomputer for controlling output frequency of said inverter device, driving or stopping of said outdoor fan and switching of said four-way valve in response to a combination of ON/OFF conditions of said ON/OFF signals received by said first, second and third signal line connectors.

15. The outdoor machine drive control unit for an air conditioner according to claim 14 wherein, when the ON/OFF signal for the compressor exhibits the ON condition, the ON/OF signal for the outdoor fan exhibits the ON condition, and the ON/OFF signal for the four-way valve changes from the heating side to the cooling side, said control device controls said inverter device to increase the number of revolutions of said compressor to a preset number of revolutions for defrosting driving.

16. The outdoor machine drive control unit for an air conditioner according to claim 15 wherein, when the ON/OFF signal for the compressor exhibits the ON condition and the ON/OFF signal for the four-way valve returns from the cooling side to the heating side, said control device controls said inverter to drive said compressor for a predetermined time under a number of revolutions lower than the number of revolutions thereof before the ON/OFF signal for the four-way valve changes from the heating side to the cooling side, and to change said four-way valve from the cooling side to the heating side after driving said compressor for said predetermined time under the low number of revolutions.

17. The outdoor machine drive control unit for an air conditioner according to claim 14 wherein said control device includes a first microcomputer for controlling said inverter device exclusively, and a second computer connected to said first, second and third signal line connectors to transmit control signals to a four-way valve driving device, an outdoor fan driving device and said first microcomputer in accordance with ON/OFF signal received through said signal line connectors.

18. The outdoor machine drive control unit for an air conditioner according to claim 14 wherein said outdoor machine includes a plurality of sets of signal line connectors, each set including said first, second and third signal line connectors, and said control device controls output frequency of said inverter device, driving or stopping of said outdoor fan and switching of said four-way valve in response to a combination of ON/OFF conditions of said ON/OFF signals through said first, second and third signal line connectors.

19. An outdoor machine drive control unit for an air conditioner of a separate type having a first signal line connector for receiving an ON/OFF signal for a compressor exclusively, a second signal line connector for receiving an ON/OFF signal indicating whether the difference of said room temperature from a preset temperature is larger than a predetermined value or not, and a third signal line connector for receiving an ON/OFF signal for switching a four-way valve to a cooling side or a heating side exclusively, which are provided in an outdoor machine, comprising:

an inverter device for supplying said compressor with power variable in frequency; and a control device including a microcomputer for controlling driving or stopping of said outdoor fan, switching of said four-way valve and said inverter device in response to a combination of ON/OFF conditions of said said signals received by said first, second and third signal line connectors.

20. The outdoor machine drive control unit for an air conditioner according to claim 19 wherein said control device decreases the number of revolutions of said compressor by a predetermined value when it is detected from the ON or OFF condition of the signal through said second signal line connector that the difference of the room temperature from the preset temperature is not larger than said predetermined value.

21. The outdoor machine drive control unit for an air conditioner according to claim 19 wherein said control device decreases the number of revolutions of said compressor by a predetermined value when it is detected from the ON or OFF condition of the signal through said second signal line connector that the difference of the room temperature from the preset temperature is not larger than said predetermined value, and thereafter increases the number of revolutions of said compressor by a predetermined value when it is detected from the ON or OFF condition of the signal through said second signal line connector that the difference of the room temperature from the preset temperature is larger than said predetermined value.

22. The outdoor machine drive control unit for an air conditioner according to claim 19 wherein said control device decreases the number of revolutions of said compressor by a first predetermined value when it is detected from the ON or OFF condition of the signal through said second signal line connector that the difference of the room temperature from the preset temperature is not larger than said predetermined value, and thereafter increases the number of revolutions of said compressor by a second predetermined value smaller than said first predetermined value when it is detected from the ON or OFF condition of the signal through said second signal line connector that the difference of the room temperature from the preset temperature is larger than said predetermined value.

* * * * *